US006466273B1

(12) United States Patent
Dosho et al.

(10) Patent No.: US 6,466,273 B1
(45) Date of Patent: Oct. 15, 2002

(54) ANALOG FIFO MEMORY DEVICE

(75) Inventors: Shiro Dosho, Osaka (JP); Naoshi Yanagisawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/076,848

(22) Filed: May 13, 1998

(30) Foreign Application Priority Data

May 15, 1997 (JP) ........................................... 9-125648

(51) Int. Cl.[7] ........................................... H04N 5/2136

(52) U.S. Cl. ...................... 348/615; 348/607; 348/715; 348/714

(58) Field of Search ................................ 348/715, 714, 348/716, 567, 607, 615, 500, 523, 518, 231, 232, 311; 365/45, 49, 189.05; H04N 5/213

(56) References Cited

U.S. PATENT DOCUMENTS

| | | | | |
|---|---|---|---|---|
| 3,760,280 A | | 9/1973 | Covington | 327/279 |
| 4,318,188 A | | 3/1982 | Hoffmann | 365/45 |
| 4,335,393 A | * | 6/1982 | Pearson | 386/10 |
| 5,264,945 A | * | 11/1993 | Kannegundla et al. | 358/444 |
| 5,557,335 A | * | 9/1996 | Oh | 348/512 |
| 5,675,388 A | * | 10/1997 | Cooper | 348/461 |
| 6,100,790 A | * | 8/2000 | Evans et al. | 340/325.54 |

FOREIGN PATENT DOCUMENTS

| | | |
|---|---|---|
| JP | 52-79851 | 7/1977 |
| JP | 61-25315 | 2/1986 |
| JP | 7-264555 | 10/1995 |

OTHER PUBLICATIONS

K. Matsui, et al., "CMOS Video Filters Using Switched Capacitor 14–MHz Circuits", IEEE Journal of Solid–State Circuits, vol. SC–20, No. 6, Dec. 1985, pp. 1096–1101.

C.C. Enz, et al., "A CMOS Chopper Amplifier", IEEE Journal of Solid–State Circuits, vol. SC–22, No. 3, Jun. 1987, pp. 335–342.

K.A. Nishimura, et al., "A Monolithic Analog Video Comb Filter in 1.2–μm CMOS", IEEE Journal of Solid–State Circuits, vol. 28, No. 12, Dec. 1993, pp. 1331–1339.

* cited by examiner

*Primary Examiner*—John Miller
*Assistant Examiner*—Jean W. Désir
(74) *Attorney, Agent, or Firm*—McDermott, Will & Emery

(57) ABSTRACT

An analog FIFO memory device allowing for the suppression of the adverse effects produced by fixed pattern noise, generated inside an analog FIFO memory, on signal components. First and second analog multipliers are respectively provided on the input and output sides of the analog FIFO memory. In synchronism with the inputs/outputs of signals to/from the analog FIFO memory, a non-inverting operation and an inverting operation are alternately and repeatedly performed on the input signals and the output signals. Then, although the signal input/output characteristics of the analog FIFO memory are not changed, the fixed pattern noise generated inside the analog FIFO memory is modulated by the second analog multiplier. As a result, the spectrum of the fixed pattern noise, which originally has a lower frequency, is shifted to have a higher frequency. That is to say, since a signal band can be separated from the fixed pattern noise in terms of frequency, the fixed pattern noise can be eliminated by a low pass filter. Consequently, even when the analog FIFO memory device of the present invention is applied for delaying TV signals, the resulting TV image quality is not deteriorated.

12 Claims, 23 Drawing Sheets

ANALOG FIFO MEMORY DEVICE

BACKGROUND OF THE INVENTION

The present invention relates to an analog FIFO memory device, and more particularly relates to technology for reducing fixed pattern noise generated inside an analog FIFO memory.

As is well known, CMOS-LSI technology has been continuously developing. An analog FIFO memory is one of the devices used in the field of analog CMOS-LSI designing. Like a digital FIFO memory, an analog FIFO memory outputs an analog signal by delaying the signal for a predetermined time.

FIG. 22 is a diagram showing a fundamental configuration for a conventional analog FIFO memory. As shown in FIG. 22, an analog FIFO memory consists basically of: an input buffer; an output buffer; memory elements (or memory cells); and an address counter. The analog FIFO memory specifies a memory element in response to a memory cell select signal output by the address counter. Next, the analog FIFO memory outputs the value of an analog signal stored in the specified memory element in the form of a voltage or charge through the output buffer. Then, the analog FIFO memory writes, into the memory element, the value of a voltage or the quantity of charge accumulated in the input buffer by the point in time of the output. That is to say, the analog FIFO memory performs so-called "read-modify-write" operations with respect to the memory cell specified by the address counter. In general, the address counter serves as a cyclic counter whereby the analog FIFO memory can delay a signal for a time corresponding to a cycle in which addresses make a round.

In such an analog FIFO memory, a capacitor element is generally used as a memory element. However, since a capacitor element is likely to be affected by noise, an offset voltage Vnoise, generated because of the accumulation of noise in capacitance, is added to an input voltage Vin of the analog FIFO memory. Also, it is known that the offset voltage Vnoise is variable depending upon the physical location of a memory element. That is to say, the output voltage Vout may be represented by the following equation:

$$\mathrm{Vout}=\mathrm{Vin}+\mathrm{Vnoise}(n)$$

where n is the address of the memory element. In other words, the offset voltage Vnoise may be represented as a function of the address n of the memory element. Such an offset voltage Vnoise(n) is generally called "fixed pattern noise".

FIGS. 23A and 23B are drawings illustrating why the fixed pattern noise generates in an analog FIFO memory. In general, an analog FIFO memory device is implemented as a parallel connection of a plurality of memory buses. In each of the memory buses, a plurality of memory elements (usually implemented as capacitor elements) are connected in parallel to each other. FIG. 23A illustrates an analog FIFO memory implemented as a parallel connection of four memory buses via two multiplexers. In the analog FIFO memory shown in FIG. 23A, the path of an analog signal is divided into four so as to correspond to the respective memory buses. And, in any of the buses, the signal is to be stored. In such a case, a clock field slew produced by one of analog switches included in each of the multiplexers or parasitic charge generated when the analog switch is turned off leaks to and is accumulated as an offset voltage in a memory element. Since the amounts of leakage subtly differ among the respective analog switches, offset voltages such as those shown in FIG. 23B are added to respective output signals. The fixed pattern noise means such offset voltages.

When an analog FIFO memory is applied to TV signal processing, such fixed pattern noise constitutes a great obstacle.

Specifically, since the human eyes are very sensible to brightness, an S/N ratio permissible for a TV signal is as strict as −60 dB or less in the specification thereof. Thus, if the fixed pattern noise of an analog FIFO memory does not meet this specification, then the fixed pattern noise appears on the TV image as noticeable noise.

The offset of a switching device results from parasitic resistance, parasitic capacitance, a subtle switching time lag or the like. However, in the current circumstances, thorough and systematic analysis thereof has not yet been accomplished. Therefore, it is extremely difficult to totally eliminate the variation in offsets. In addition, considering the variation in device characteristics resulting from various factors during normal LSI fabrication processes, it is virtually impossible to suppress the fixed pattern noise to the value required by TV signal specifications or less through some modification of the fabrication processes.

Accordingly, if an analog FIFO memory is used for TV signal processing, fixed pattern noise undesirably appears on the TV image and adversely deteriorates the quality of image.

Analog FIFO memories are disclosed, for example, by K. Matsui, T. Matsuura, et al., in "CMOS Video Filters Using Switched Capacitor 14-MHz Circuits", IEEE Journal of Solid-State Circuits, pp. 1096–1101, 1985 and by Ken A. Nishimura and Paul R. Gray, "A Monolithic Analog Video Comb Filter in 1.2-μm CMOS", IEEE Journal of Solid-State Circuits, Vol. 28, No. 12, pp. 1331–1339, December 1993. However, none of these analog FIFO memories can prevent fixed pattern noise from being generated. Thus, the practical application of an analog FIFO memory for TV signal processing has still been unsolved for more than as long as ten years since the former report was submitted.

SUMMARY OF THE INVENTION

The present invention provides an analog FIFO memory device capable of reducing the influence of fixed pattern noise, generated inside the analog FIFO memory device, on signal components. A more particular object of the present invention is eliminating the adverse effects produced by an analog FIFO memory device on the TV image quality when the device is applied for TV signal processing.

Specifically, the analog FIFO memory device of the present invention includes an analog FIFO memory. The analog FIFO memory includes a plurality of memory elements. Each of the memory elements stores an analog signal. The analog FIFO memory delays input analog signals for a predetermined time and then outputs the delayed analog signals in accordance with an order of input of the input analog signals. The analog FIFO memory further includes an output transformer for performing a transformation on output signals of the analog FIFO memory so as to suppress influence of fixed pattern noise, generated inside the analog FIFO memory, on signal components of the output signals. The analog FIFO memory further includes an input transformer for performing a transformation, inverse of the transformation performed by the output transformer, on the input analog signals of the analog FIFO memory.

In the analog FIFO memory device of the present invention, the fixed pattern noise generated inside the analog FIFO memory is transformed by the output transformer so as to suppress the influence of the fixed pattern noise on the signal components. In this case, the signal components are also transformed by the output transformer. However, since the input signals of the analog FIFO memory device are subjected by the input transformer to the transformation inverse of the transformation performed by the output transformer, the resulting signal components are not transformed at all, and the original signal waveform is retained. Thus, it is possible to suppress the influence of the fixed pattern noise, generated inside the analog FIFO memory, on the signal components without modifying the signal components in any way.

In one embodiment of the present invention, the output transformer preferably performs a frequency modulation such that the frequency of the fixed pattern noise is shifted to reach a higher frequency exceeding a signal band.

In such a case, as a result of the frequency modulation performed by the output transformer, the frequency of the fixed pattern noise, generated inside the analog FIFO memory, is shifted to reach a higher frequency exceeding the signal band. By contrast, the frequency characteristics of the signal components are unchanged after all. Thus, it is possible to separate the fixed pattern noise from the signal components in terms of frequency. As a result, the influence of the fixed pattern noise on the signal components can be advantageously reduced without modifying the signal components at all.

In another embodiment of the present invention, the input transformer preferably performs a non-inverting operation and an inverting operation alternately on the input analog signals of the analog FIFO memory in synchronism with respective times when the signals are input/output to/from the analog FIFO memory. The output transformer preferably performs a non-inverting operation and an inverting operation alternately on the output analog signals of the analog FIFO memory in synchronism with the respective times when the signals are input/output to/from the analog FIFO memory.

In such a case, since the output transformer alternately non-inverts and inverts the fixed pattern noise in synchronism with the respective times when the signals are input/output to/from the analog FIFO memory, the fixed pattern noise is modulated by half of the frequency with which signals are input/output to/from the analog FIFO memory. On the other hand, the input transformer alternately non-inverts and inverts the input analog signals of the analog FIFO memory in synchronism with respective times when the signals are input/output to/from the analog FIFO memory. And the output transformer alternately non-inverts and inverts the output signals thereof in synchronism with respective times when the signals are input/output to/from the analog FIFO memory. Thus, although the phase of the output signal of the analog FIFO memory device is inverted or non-inverted with respect to that of the input signal thereof, the signal components thereof are not subjected to the frequency modulation. Accordingly, the frequency of the fixed pattern noise is shifted to be higher by half of the frequency with which signals are input/output to/from the analog FIFO memory. As a result, it is possible to separate the fixed pattern noise from the signal components with certainty in terms of frequency.

In still another embodiment of the present invention, the analog FIFO memory device preferably includes an even number of the analog FIFO memories. The respective analog FIFO memories preferably operate in parallel with each other and are accessed sequentially and cyclically. The input transformer is preferably constituted by selectively providing an input signal inverter for every other one of the even number of analog FIFO memories on the input side thereof in accordance with an order of access. The output transformer is preferably constituted by selectively providing an output signal inverter for every other one of the even number of analog FIFO memories on the output side thereof in accordance with the order of access.

In such a case, by providing an input signal inverter and an output signal inverter for every other one of the even number of analog FIFO memories on the input side and the output side, respectively, in accordance with the order of access, only the fixed pattern noise can be subjected to the frequency modulation without providing any means for alternately performing a non-inverting operation and an inverting operation in synchronism with the inputs/outputs of signals to/from the analog FIFO memory. As a result, by employing a simplified circuit configuration, it is possible to separate the fixed pattern noise from the signal components with certainty in terms of frequency.

In still another embodiment of the present invention, the analog FIFO memory preferably includes: an even number of memory buses, in each of which a plurality of memory elements for storing analog differential signals therein are connected to each other; an input multiplexer for sequentially and cyclically inputting input analog differential signals to the respective memory buses; and an output multiplexer for sequentially and cyclically outputting the analog differential signals from the respective memory buses. The input transformer is preferably constituted by selectively connecting the input multiplexer to every other one of the even number of memory buses in accordance with an order of input of the analog differential signals such that the analog differential signals are inverted and then input to the selected memory buses. The output transformer is preferably constituted by selectively connecting the output multiplexer to every other one of the even number of memory buses in accordance with an order of output of the analog differential signals such that the analog differential signals are inverted and then output from the selected memory buses.

In such a case, by connecting every other one of the even number of memory buses to the input multiplexer such that the analog differential signals are inverted and then input to the memory buses in accordance with the order of input and to the output multiplexer such that the analog differential signals are inverted and then output from the memory buses in accordance with the order of output, respectively, only the fixed pattern noise can be subjected to the frequency modulation without providing any means for alternately performing a non-inverting operation and an inverting operation in synchronism with the inputs/outputs of signals to/from the analog FIFO memory. As a result, by employing a simplified circuit configuration, it is possible to separate the fixed pattern noise from the signal components with certainty in terms of frequency.

In still another embodiment, the analog FIFO memory device of the present invention is preferably applicable for delaying a TV signal. The output transformer preferably performs a frequency modulation so as to visually eliminate fixed pattern noise from a TV image.

In such a case, the fixed pattern noise, generated inside the analog FIFO memory, is visually eliminated from the TV image as a result of the frequency modulation performed by the output transformer. By contrast, the frequency characteristics of the signal components per se are unchanged. Thus, it is possible to visually reduce the influence of the fixed pattern noise on the signal components on the TV image.

In still another embodiment of the present invention, the output transformer preferably performs voltage transformation such that a level of the fixed pattern noise is compressed with respect to a signal level.

In such a case, the level of the fixed pattern noise, generated inside the analog FIFO memory, is compressed with respect to the signal level as a result of the voltage transformation performed by the output transformer, whereas the level of the signal components is unchanged. Thus, the fixed pattern noise can be separated from the signal components in terms of voltage levels. Consequently, it is possible to reduce the influence of the fixed pattern noise on the signal components without modifying the signal components at all.

The analog FIFO memory device according to another aspect of the present invention is applicable for delaying a TV signal. The analog FIFO memory device includes an analog FIFO memory. The analog FIFO memory includes a plurality of memory elements, each of which stores analog signal, and a counter for sequentially specifying, among the memory elements, a memory element in which an analog signal is stored. The analog FIFO memory delays input analog signals for a time and then outputs the delayed analog signals in accordance with an order of input analog signals. The analog FIFO memory device further includes resetting means for resetting the counter at respectively different times corresponding to the refresh of a TV image in response to a TV vertical synchronizing signal. The resetting means changes a relationship between the memory elements and positions on the TV image, every time the TV image is refreshed, and thereby visually eliminates fixed pattern noise, generated inside the analog FIFO memory, from the TV image.

In the analog FIFO memory device of the present invention, since the resetting means resets the counter of the analog FIFO memory at respectively different times every time a TV image is refreshed, the relationship between the memory elements and positions on the TV image is changed such that the fixed pattern noise is visually eliminated from the TV image. Thus, it is possible to visually eliminate the influence of the fixed pattern noise on the signal components from the TV image.

BRIEF DESCRIPTION OF THE DRAWINGS

FIG. 3A illustrates the waveform of an input signal S1;

FIG. 3B illustrates the waveform of a signal component S2 of an output signal of an analog FIFO memory 1;

FIG. 3C illustrates the waveform of a signal component S3 of an output signal of an output multiplier 3;

FIG. 3D illustrates the waveform of a fixed pattern noise component N1 generated in the analog FIFO memory 1; and FIG. 3E illustrates the waveform of a fixed pattern noise component N2 of the output signal of the output multiplier 3.

FIG. 7A illustrates vertical addressing; and FIG. 7B illustrates horizontal addressing.

FIG. 10A is a diagram illustrating a schematic arrangement thereof; and

FIG. 10B is a timing chart illustrating a correspondence between a memory to be accessed and the operations of multipliers in the analog FIFO memory device.

FIG. 13A illustrates the waveform of fixed pattern noise with no chopper operation performed; and FIG. 13B illustrates the waveform of fixed pattern noise with a chopper operation performed in this embodiment.

DETAILED DESCRIPTION OF THE INVENTION

First, the fundamental principles of the present invention will be described.

Figure 1:
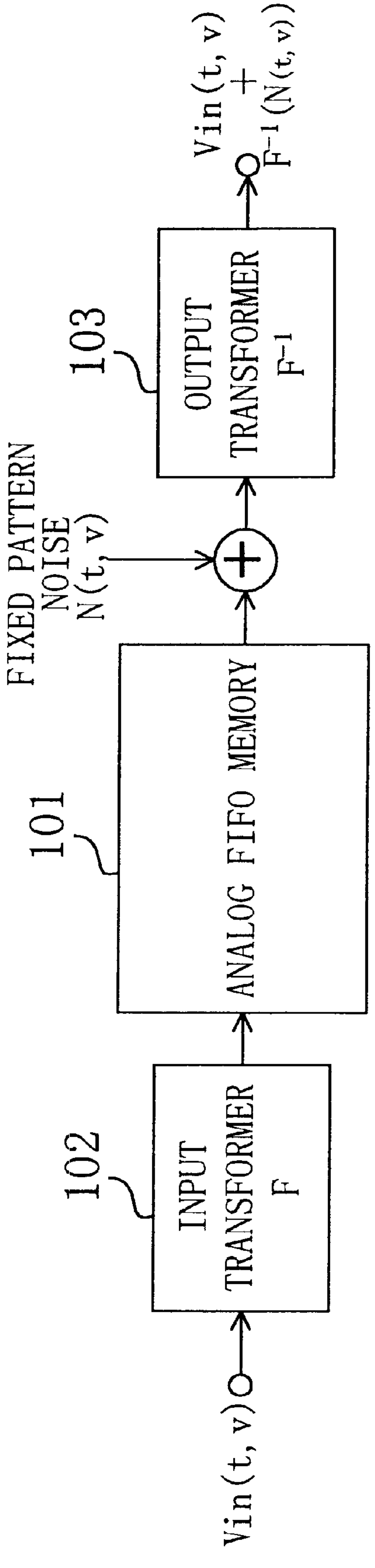
FIG. 1 is a diagram illustrating the principle in which the analog FIFO memory device of the present invention reduces fixed pattern noise.

FIG. 1 is a diagram illustrating the principle in which the analog FIFO memory device of the present invention reduces fixed pattern noise. As shown in FIG. 1, the analog FIFO memory device of the present invention includes: an input transformer 102 for performing, as preprocessing, a transformation F on a signal Vin(t, v) input to an analog FIFO memory 101; and an output transformer 103 for performing an inverse transformation $F^{-1}$ of the preprocessing on a signal output from the analog FIFO memory 101.

In the analog FIFO memory device shown in FIG. 1, the input signal Vin(t, v) is output in the original form without being modified in any way as a result of the combination of the transformation F performed by the input transformer 102 and the inverse transformation $F^{-1}$ performed by the output transformer 103. On the other hand, the fixed pattern noise N(t, v), generated inside the analog FIFO memory 101, is subjected to the inverse transformation $F^{-1}$ by the output transformer 103 so as to be transformed and output as $F^{-1}$ (N(t, v)). Thus, the output of the output transformer 103 is given by $$\mathrm{Vin}(t,v)+F^{-1}(N(t,v))$$

That is to say, if the inverse transformation $F^{-1}$ performed by the output transformer 103 is appropriately set, then the influence of the fixed pattern noise on the signals can be reduced. In addition, if the transformation F performed by the input transformer 102 is inverse of the inverse transformation $F^{-1}$ performed by the output transformer 103, then the input signal Vin(t, v) is not modified at all.

If the inverse transformation $F^{-1}$ on the output side of the analog FIFO memory is regarded as a transformation for reducing the influence of the fixed pattern noise, generated inside the analog FIFO memory, on the signal components, then it is the transformation F on the input side of the analog FIFO memory that is inverse of the transformation $F^{-1}$.

Based on such a principle, the present invention reduces the influence of the fixed pattern noise, generated inside the analog FIFO memory, on the signals by setting the transformation F and the inverse transformation $F^{-1}$ in terms of time (or frequency), voltage and human visual sense.

Embodiment 1

In the analog FIFO memory device in the first embodiment of the present invention, the transformation F and the inverse transformation $F^{-1}$ are set in terms of time (or frequency). More specifically, in this embodiment, particular attention is paid to the fact that the fixed pattern noise are likely to be generated as low frequency components inside an analog FIFO memory. By applying the principle of a so-called chopper circuit to the analog FIFO memory, the fixed pattern noise is turned out of the signal band to a higher frequency domain and then removed by using a filter.

Figure 2:
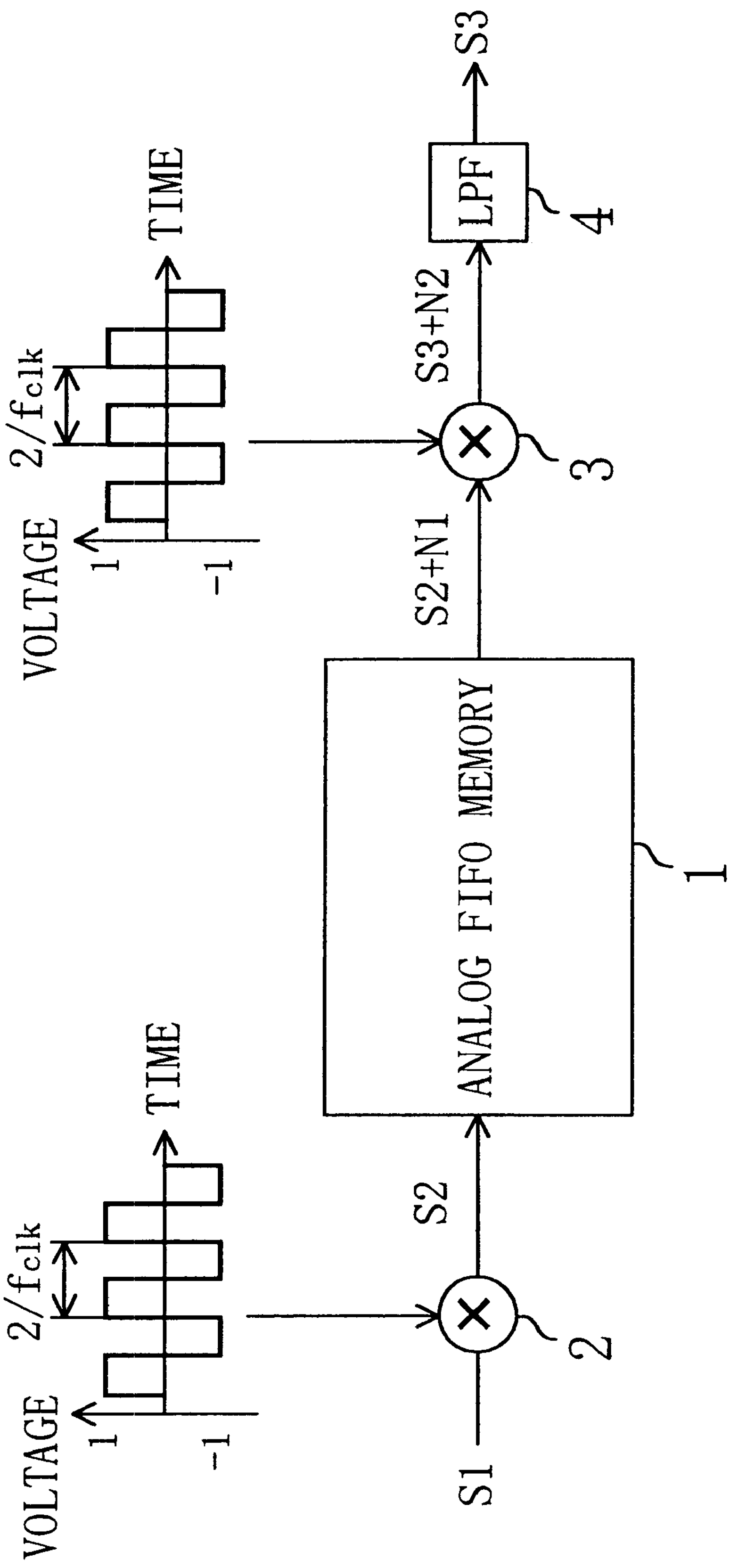
FIG. 2 is a diagram showing a schematic arrangement of the analog FIFO memory device in the first embodiment of the present invention.

FIG. 2 is a diagram showing a schematic arrangement of the analog FIFO memory device in this embodiment. As shown in FIG. 2, the analog FIFO memory device of this embodiment includes: an input and an output multiplier 2, 3 on the input and output sides of an analog FIFO memory 1, respectively; and a low pass filter 4 for removing high frequency components of the output signal of the output multiplier 3.

Figure 3A:
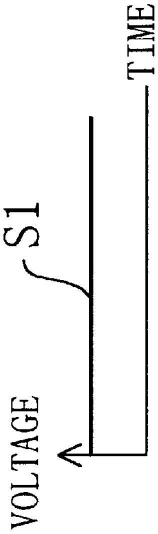
FIGS. 3A through 3E are waveform charts illustrating respective waveforms of signals and fixed pattern noise in the analog FIFO memory device shown in FIG. 2.
Figure 3B:
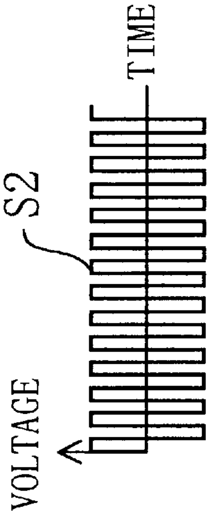
Figure 3C:
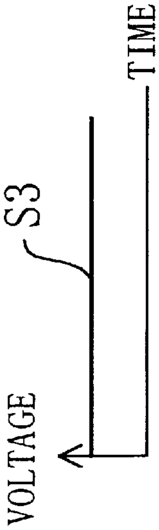
Figure 3D:
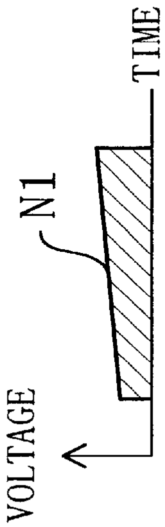
Figure 3E:
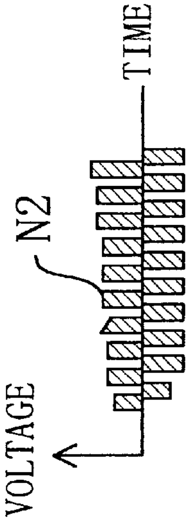

FIGS. 3A through 3E are waveform charts illustrating the respective waveforms of signals and fixed pattern noise components in the analog FIFO memory device shown in FIG. 2. FIG. 3A illustrates the waveform of an input signal S1. FIG. 3B illustrates the waveform of a signal component S2 of an output signal of the analog FIFO memory 1. FIG. 3C illustrates the waveform of a signal component S3 of an output signal of the output multiplier 3. FIG. 3D illustrates the waveform of a fixed pattern noise component N1 generated in the analog FIFO memory 1. And FIG. 3E illustrates the waveform of a fixed pattern noise component N2 of the output signal of the output multiplier 3.

The input multiplier 2 and the output multiplier 3 alternately and repeatedly non-invert and invert the input and output signals of the analog FIFO memory 1 in synchronism with the times when the signals are input/output to/from the analog FIFO memory 1 (i.e., in synchronism with a clock signal driving the analog FIFO memory 1). In other words, a socalled chopper operation is performed by the input multiplier 2 and the output multiplier 3.

As a result of these operations, the waveform of the input signal S1 is once modulated by the input multiplier 2 and then re-modulated by the output multiplier 3 so as to be output with the original waveform, as shown in FIGS. 3A to 3C. However, the fixed pattern noise generated inside the analog FIFO memory 1 is modulated only by the output multiplier 3. Thus, though the fixed pattern noise component N1 such as that shown in FIG. 3D is ordinarily output, the fixed pattern noise component N2 output from the output multiplier 3 comes to have such a waveform as that shown in FIG. 3E. This is because the fixed pattern noise is alternately non-inverted and inverted.

Figure 4A:
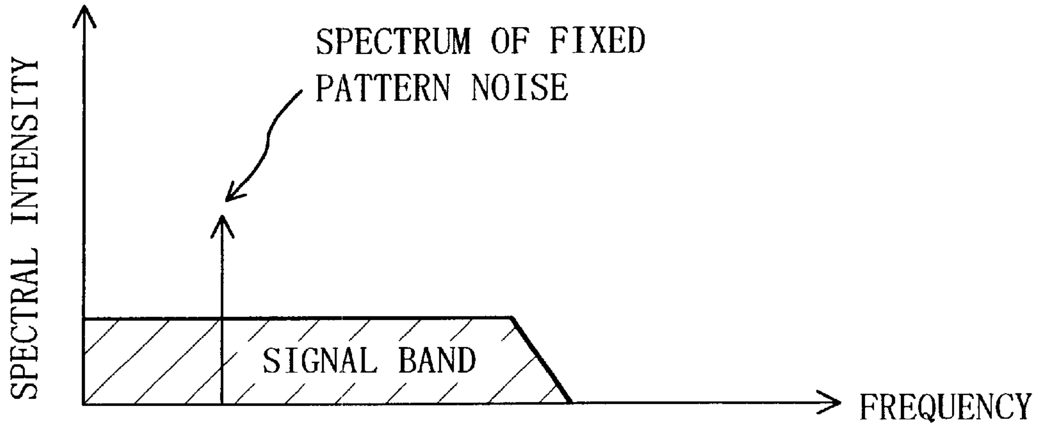
FIGS. 4A and 4B are diagrams illustrating frequency spectra of the signals and the fixed pattern noise components in the analog FIFO memory device shown in FIG. 2.
Figure 4B:
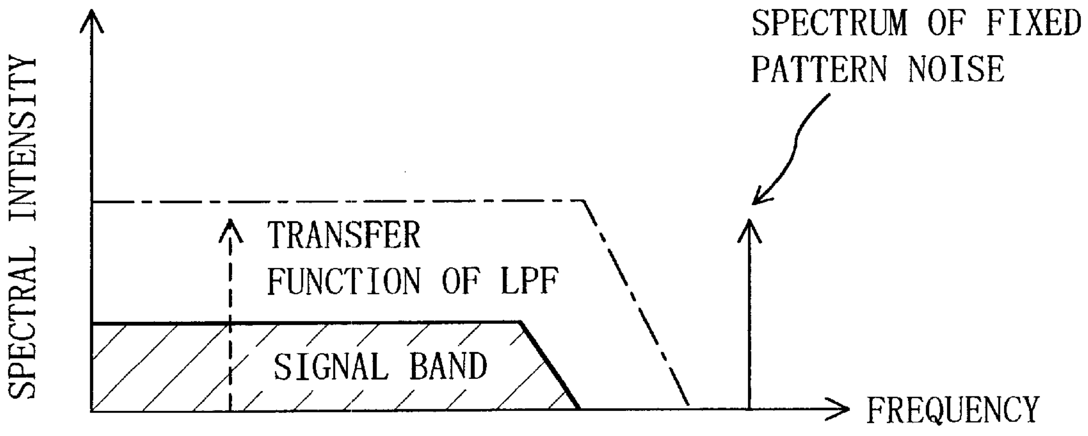

This principle can be represented with frequency spectra as shown in FIGS. 4A and 4B. Specifically, if the chopper operation is not performed, then the spectrum of the fixed pattern noise is located within the signal band as shown in FIG. 4A. Thus, it is impossible to separate the signals from the fixed pattern noise. In contrast, if the chopper operation is performed as in this embodiment, then the spectrum of the fixed pattern noise can be turned out of the spectrum of the signal band as shown in FIG. 4B. Thus, it is possible to make the low pass filter (LPF) 4 remove the fixed pattern noise components.

Here, the point is synchronizing the input/output times of the analog FIFO memory 1 with the times when non-inverting and inverting are switched in the input multiplier 2 and the output multiplier 3. Thus, it is possible to prevent the signals from being input/output to/from the analog FIFO memory 1 before the operations of the input multiplier 2 and the output multiplier 3 have not been completely switched. In other words, it is also possible to prevent a transitional signal, generated during switching of the operations of the multipliers 2 and 3, from being stored in the analog FIFO memory 1. In a commonly used chopper circuit, such synchronization is unnecessary. However, in this embodiment, it is most preferable to synchronize the input/output times of the analog FIFO memory 1 with the times when non-inverting and inverting are switched in the input multiplier 2 and the output multiplier 3. In such a case, the chopper operation can be performed while retaining the completely same waveform for an input signal.

In FIG. 2, by synchronizing the clock signal (frequency: fclk) driving the analog FIFO memory 1 with the signals (frequency: fclk/2) driving the input multiplier 2 and the output multiplier 3, the signal input/output times of the analog FIFO memory 1 are synchronized with the times when non-inverting and inverting are switched in the input multiplier 2 and the output multiplier 3.

Herein, assume that a DC component such as that shown in 25 FIG. 3A is input as the input signal S1. Then, the signal to be passed through the input multiplier 2 and then written into the analog FIFO memory 1 becomes the signal S2 modulated with the frequency of fclk/2 as shown in FIG. 3B. Since the signal S2 is re-modulated by the output multiplier 3 in a similar manner after having been output from the analog FIFO memory 1, the signal S2 is transformed into the original DC component as shown in FIG. 3C. That is to say, if an operation that is totally inverse of the operation applied on the input signal is performed on the signal to be output, the waveform of the input signal is completely restored.

If the input signal S1 is non-inverted both on the input and output sides or if the signal is inverted both on the input and output sides, then the output signal S3 has non-inverted phase. On the other hand, if the input signal S1 is non-inverted on the input side but is inverted on the output side or if the signal is inverted on the input side but is non-inverted on the output side, then the output signal S3 has inverted phase. In either case, it is possible to separate the signal from the fixed pattern noise in terms of frequency.

Figure 5:
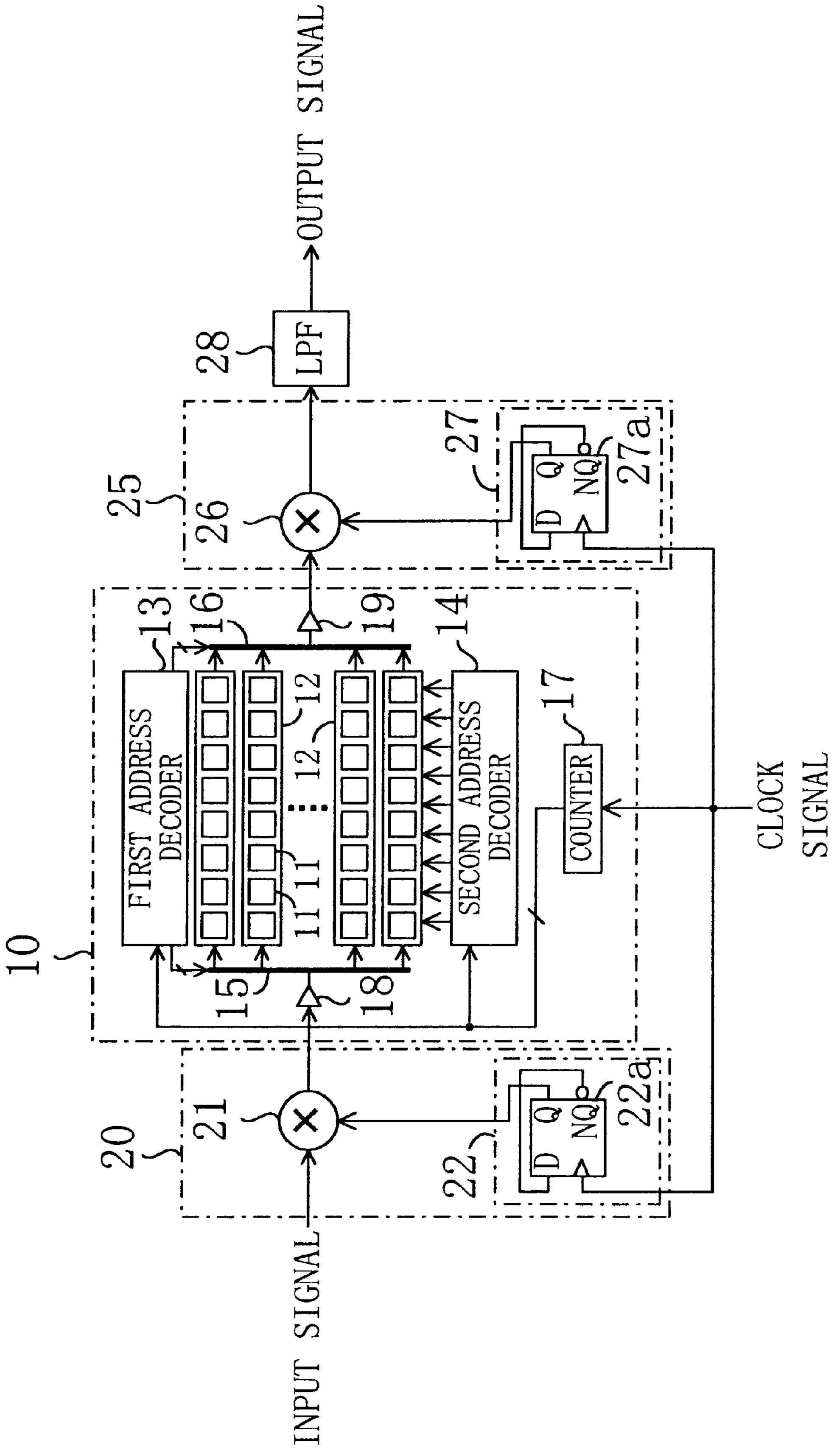
FIG. 5 is a diagram illustrating a circuit configuration of the analog FIFO memory device in the first embodiment of the present invention.

FIG. 5 is a diagram illustrating a circuit configuration of the analog FIFO memory device in the first embodiment of the present invention. In FIG. 5, the reference numeral 10 denotes an analog FIFO memory. The reference numeral 21 denotes a first analog multiplier functioning as input signal inverter for alternately non-inverting and inverting an input signal. The reference numeral 22 denotes a first frequency divider for generating and outputting a signal controlling switching between non-inverting and inverting of the first analog multiplier 21. The reference numeral 26 denotes a second analog multiplier functioning as output signal inverter for alternately non-inverting and inverting a signal output from the analog FIFO memory 10. The reference numeral 27 denotes a second frequency divider for generating and outputting a signal controlling switching between non-inverting and inverting of the second analog multiplier 26. And the reference numeral 28 denotes a low pass filter for removing high frequency components from the output signal of the second analog multiplier 26. The first and the second frequency is dividers 22 and 27 divide the frequency of the clock signal driving the analog FIFO memory 10, thereby generating a control signal of the first and the second analog multipliers 21 and 26, respectively. The first and the second frequency dividers 22 and 27 may be simply implemented using D flip-flops 20 22*a* and 27*a*, respectively.

An input transformer 20 is constituted by the first analog multiplier 21 and the first frequency divider 22. An output transformer is constituted by the second analog multiplier 26 and the second frequency divider 27. The analog FIFO memory 10 includes: a plurality of memory buses 12, to each of which a plurality of memory elements (memory cells) are connected; a first address decoder 13 for addressing one of the memory buses 12 to/from which a signal is input/output; a second address decoder 14 for addressing one of the memory cells 11 to/from which a signal is written/read on the memory bus 12 addressed by the first address decoder 13; an input multiplexer 15 for inputting a signal to the memory bus 12 addressed by the first address decoder 13; an output multiplexer 16 for outputting a signal from the memory bus 12 addressed by the first address decoder 13; a counter 17 for counting externally provided clock signals and for specifying a memory cell 11 to/from which a signal is written/read for the first and the second address decoders 13 and 14 based on the counter data; an input buffer 18; and an output buffer 19.

Hereinafter, the operation of the analog FIFO memory device of this embodiment will be described.

An input signal is input to the first analog multiplier 21. In response to the input signal, the first analog multiplier 21 alternately non-inverts and inverts the input signal in accordance with the logic level of the control signal generated and output from the first frequency divider 22 and then outputs the signal to the analog FIFO memory 10.

In the analog FIFO memory 10, read-modify-write operations are performed in synchronism with externally provided clock signals. When a memory cell 11 to/from which a signal is written/read is specified by the counter 17, one memory bus 12 is addressed by the first address decoder 13 and one memory cell 11 is addressed in the memory bus 12 by the second address decoder 14. The output multiplexer 16 reads out the signal stored in the memory cell 11 addressed by the second address decoder 14 from the memory bus 12 addressed by the first address decoder 13. The read signal is output from the analog FIFO memory 10 via the output buffer 19.

On the other hand, the signal input to the analog FIFO memory 10 is also input to the input multiplexer 15 via the input buffer 18. The input multiplexer 15 provides the input signal to the memory bus 12 addressed by the first address decoder 13. In the memory bus 12, the input signal is stored in the memory cell 11 addressed by the second address decoder 14.

The output signal of the analog FIFO memory 10 is input to the second analog multiplier 26. In response to the signal, the second analog multiplier 26 alternately non-inverts and inverts the output signal of the analog FIFO memory 10 in accordance with the logic level of the control signal generated and output from the second frequency divider 27 and then outputs the signal to the low pass filter 28. The low pass filter 28 removes the low frequency noise components from the output signal of the second analog multiplier 26.

Figure 6:
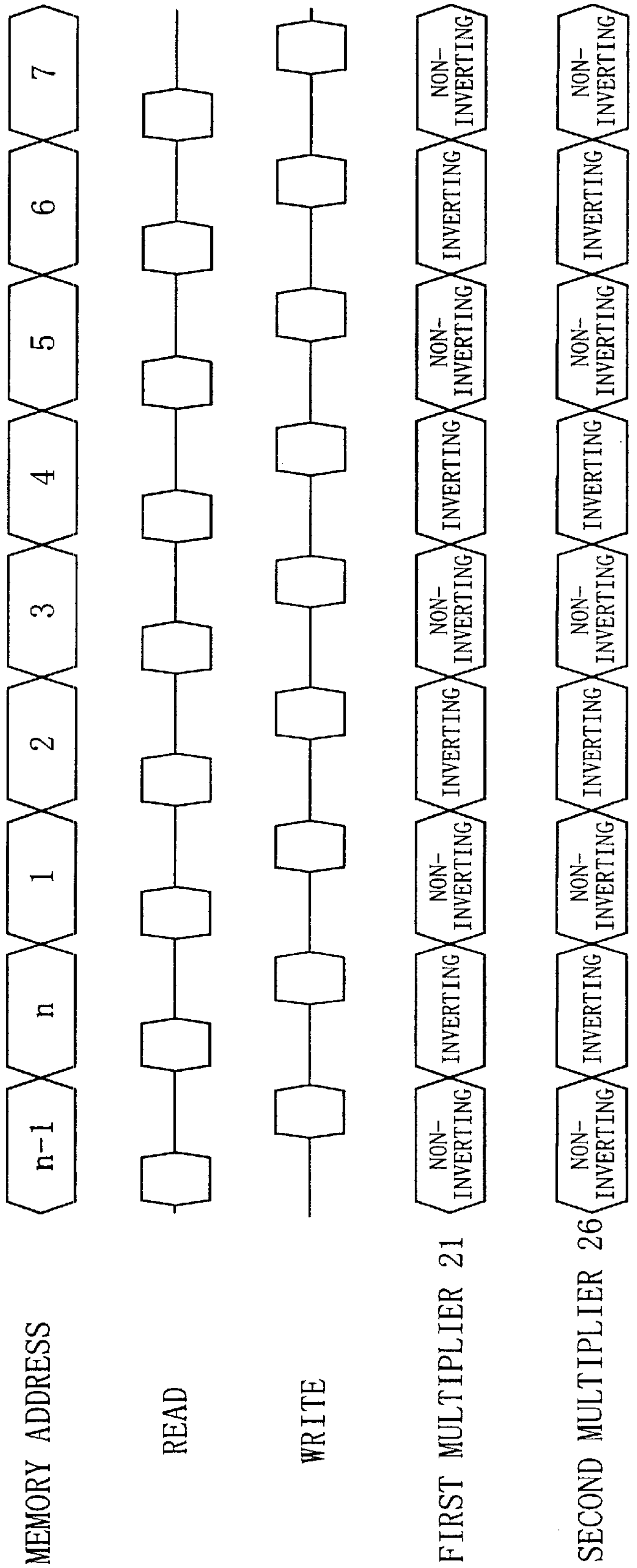
FIG. 6 is a timing chart illustrating signal reading/writing times of an analog FIFO memory 10 shown in FIG. 5.

FIG. 6 is a timing chart illustrating the relationship between the times when signals are written/read to/from the analog FIFO memory 10 and the times when non-inverting and inverting are switched in the first and the second analog multipliers 21 and 26. As shown in FIG. 6, the analog FIFO memory 10 firstly reads a signal stored in a memory cell 11 specified by the counter 17. Then, the analog FIFO memory 10 writes a signal into the memory cell 11 from which the signal has been read out. That is to say, the analog FIFO memory 10 performs a read-modify-write operation.

In synchronism with signal reading/writing from/to the analog FIFO memory 10, the first and the second analog multipliers 21 and 26 alternately and repeatedly perform the non-inverting operation and the inverting operation. This synchronization is realized by controlling the first and the second analog multipliers 21 and 26 in response to a signal generated by making the first and the second frequency dividers 22 and 27 divide the frequency of the clock signal driving the analog FIFO memory 10. Each of the first and the second frequency dividers 22 and 27 constitutes a divide-by-two frequency divider. Thus, if the frequency of the clock signal driving the analog FIFO memory 10 is denoted by fclk, then the frequency of the control signal provided to the first and the second analog multipliers 21 and 26 is denoted by fclk/2. Therefore, the fixed pattern noise generated inside the analog FIFO memory 10 is shifted to have a higher frequency by fclk/2 as a result of the chopper operation performed by the first and the second analog multipliers 21 and 26. Accordingly, in order to separate the fixed pattern noise from the signal band, the following condition is preferably satisfied:

$$fclk > 4 \times f\ signal$$

where f signal is the upper limit frequency of the signal band.

As shown in FIG. 6, the operation, i.e., either non-inverting or inverting, performed by the first multiplier 21 is always the same as that performed by the second multiplier 26. Thus, the output signal has non-inverted phase if the number of delay stages of the analog FIFO memory 10 is an even number and has an inverted phase if the number of delay stages of the analog FIFO memory 10 is an odd number. In either case, it is possible to separate the signals from the fixed pattern noise in terms of frequency.

Alternatively, these multipliers may also be controlled such that the second analog multiplier 26 is performing an inverting operation while the first analog multiplier 21 is performing a non-inverting operation and that the second analog multiplier 26 is performing a non-inverting operation while the first analog multiplier 21 is performing an inverting operation. In such a case, the output signal has inverted phase if the number of delay stages of the analog FIFO memory 10 is an even number and has a non-inverted phase if the number of delay stages of the analog FIFO memory 10 is an odd number. In either case, it is also possible to separate the signals from the fixed pattern noise in terms of frequency.

It is noted that the chopper operation employed in this embodiment works effectively in removing low frequency noise components, but works against in removing high frequency noise components. For example, assume that high frequency noise having a frequency of fclk/2 is generated from the analog FIFO memory 10. If a modulation is applied with a frequency of fclk/2 as in this embodiment, then the high frequency noise is turned into low frequency noise to the contrary, adversely overlaps with the signal band and becomes hard to remove. In other words, the present embodiment has been devised by paying particular attention to the fact that the fixed pattern noise generated in the analog FIFO memory 10 has a low frequency. This point will be described more fully below.

Figure 7A:
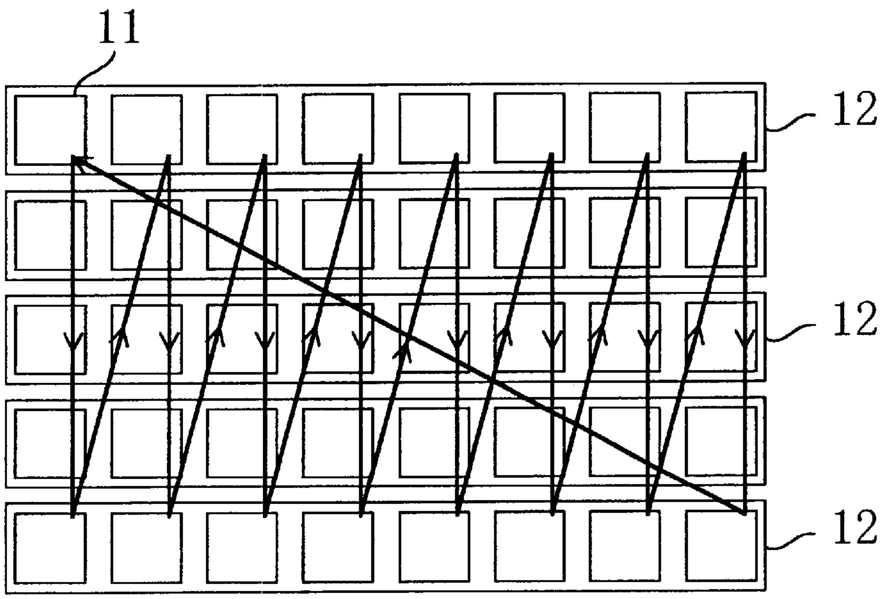
FIGS. 7A and 7B are diagrams illustrating exemplary memory cell addressing in an analog FIFO memory.
Figure 7B:
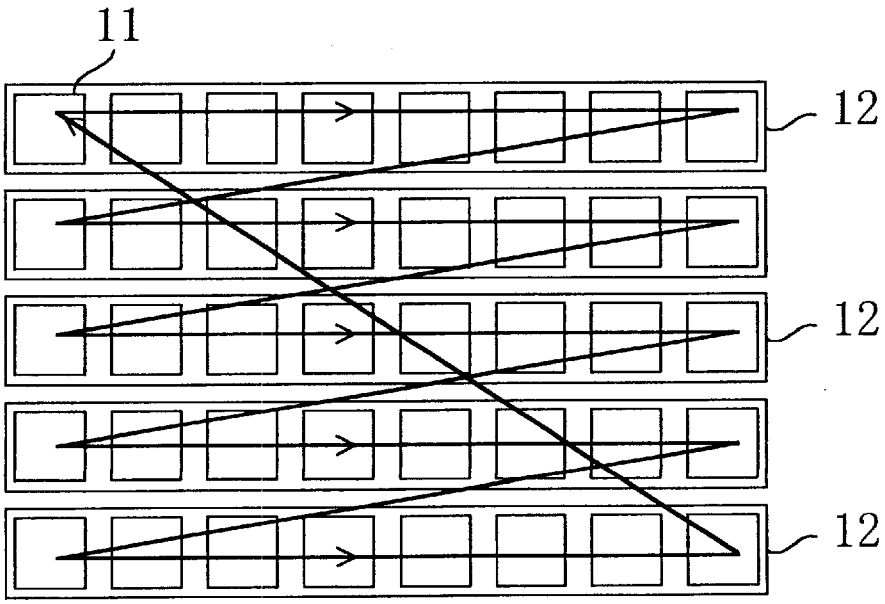

FIGS. 7A and 7B are diagrams illustrating exemplary memory cell addressing in the analog FIFO memory 10: FIG. 7A illustrates vertical addressing in which memory cells 11 are addressed vertically to the memory bus 12; and FIG. 7B illustrates horizontal addressing in which memory cells 11 are addressed horizontally to the memory bus 12. Assume that the analog FIFO memory 10 is constituted by a number m of memory buses 12 and that a number n of memory cells 11 are connected to each of the buses 12. Then, in vertical addressing shown in FIG. 7A, the fixed pattern noise has a frequency component of fclk/m. On the other hand, in horizontal addressing shown in FIG. 7B, the fixed pattern noise has a frequency component of fclk/n. Since n and m are usually very large numbers, the frequency of the fixed pattern noise can be regarded as being sufficiently lower than the clock frequency fclk driving the analog FIFO memory 10. Thus, the chopper operation employed in this embodiment works effectively in removing the fixed pattern noise.

Figure 8:
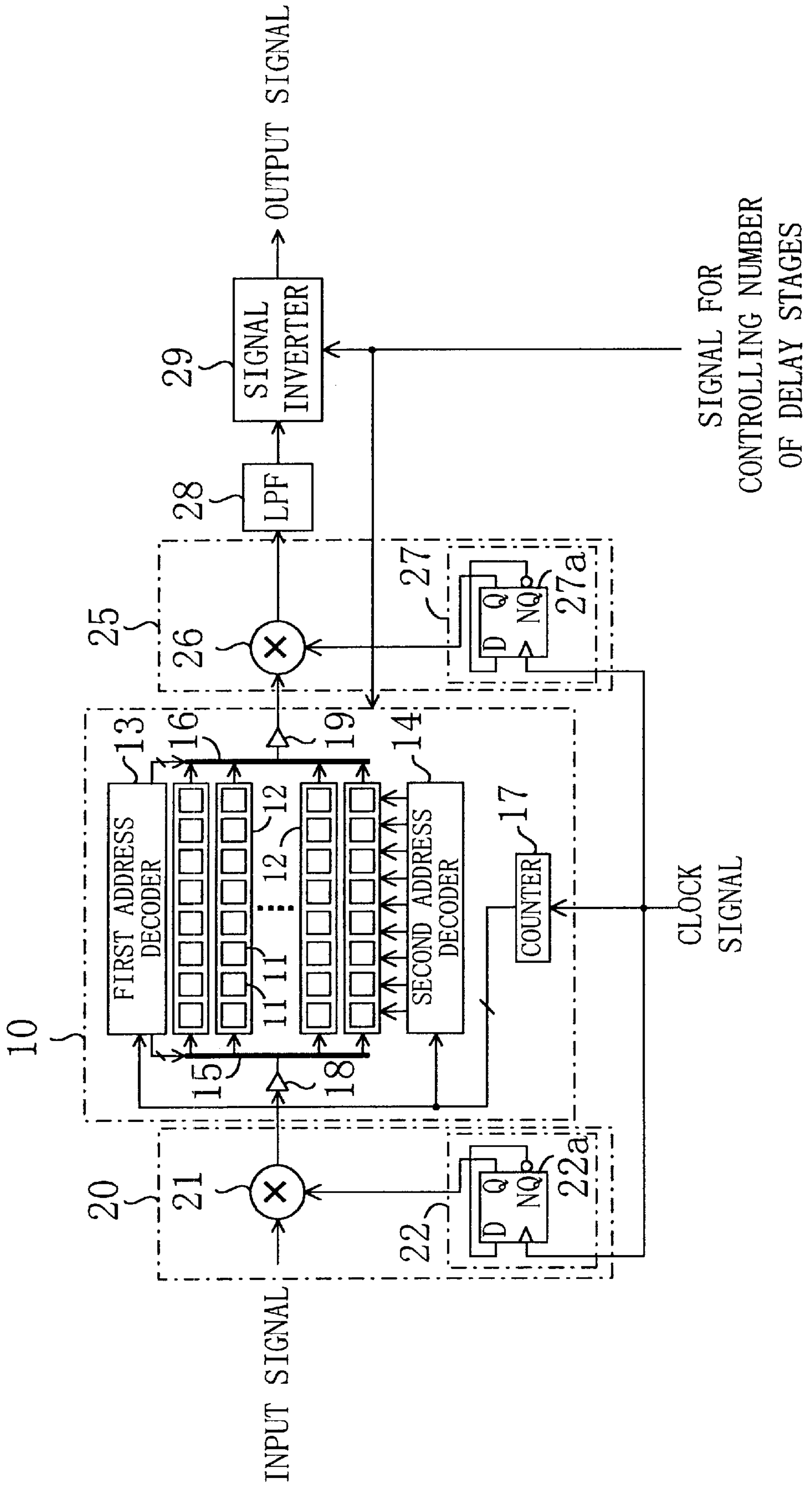
FIG. 8 is a diagram illustrating a variant of the analog FIFO memory device in the first embodiment of the present invention, in which the number of delay stages of the analog FIFO memory 10 is adapted to be variable.

FIG. 8 is a diagram illustrating a variant of the analog FIFO memory device in the first embodiment of the present invention. In FIG. 8, the number of delay stages of the analog FIFO memory 10 is adapted to be variable. The analog FIFO memory device shown in FIG. 8 has substantially the same configuration as that of the analog FIFO memory device shown in FIG. 5 except that the analog FIFO memory device shown in FIG. 8 further includes a signal inverter 29 posterior to the low pass filter 28. The signal inverter 29 is provided for making the phase of an output signal constant with respect to the phase of an input signal even if the number of delay stages of the analog FIFO memory 10 is changed. In this variant, a signal for controlling the number of delay stages of the analog FIFO memory 10 is input to the signal inverter 29. The signal inverter 29 inverts the signal output from the low pass filter 28 only when the number of delay stages of the analog FIFO memory 10 is an odd number.

In the analog FIFO memory device shown in FIG. 5, if the number of delay stages of the analog FIFO memory 10 is an even number, the signal is inverted by the second analog multiplier 26 when the signal is output from the analog FIFO memory 10 after having been inverted by the first analog multiplier 21 and input to the analog FIFO memory 10. On the other hand, when the signal is output from the analog FIFO memory 10 after having been non-inverted by the first analog multiplier 21 and input to the analog FIFO memory 10, the signal is non-inverted by the second analog multiplier 26. Thus, the output signal has non-inverted phase with respect to the input signal.

Conversely, if the number of delay stages of the analog FIFO memory 10 is an odd number, the signal is non-inverted by the second analog multiplier 26 when the signal is output from the analog FIFO memory 10 after having been inverted by the first analog multiplier 21 and input to the analog FIFO memory 10. On the other hand, when the signal is output from the analog FIFO memory 10 after having been non-inverted by the first analog multiplier 21 and input to the analog FIFO memory 10, the signal is inverted by the second analog multiplier 26. Thus, the output signal has an inverted phase with respect to the input signal.

Accordingly, if the number of delay stages of the analog FIFO memory 10 is variable, then the phase of the output signal is either inverted or non-inverted in accordance with the number of delay stages in the analog FIFO memory 10.

Thus, in the variant shown in FIG. 8, the signal inverter 29 is provided posterior to the low pass filter 28, whereby the output signal is inverted by the signal inverter 29 only when the number of delay stages in the analog FIFO memory 10 is an odd number. This makes it possible to always obtain an output signal having non-inverted phase with respect to the input signal, irrespective of the number of delay stages of the analog FIFO memory 10.

Alternatively, the signal inverter 29 may invert the signal output from the low pass filter 28 only when the number of delay stages of the analog FIFO memory 10 is an even number. In such a case, an output signal having inverted phase with respect to the input signal can always be obtained.

Moreover, even if the multipliers are controlled such that the second analog multiplier 26 is performing an inverting operation while the first analog multiplier 21 is performing a non-inverting operation and that the second analog multiplier 26 is performing a non-inverting operation while the first analog multiplier 21 is performing an inverting operation, the same effects can also be attained by providing the signal inverter 29. In such a case, if the signal inverter 29 is adapted to invert the signal output from the low pass filter 28 only when the number of delay stages of the analog FIFO memory 10 is an even number, an output signal having non-inverted phase with respect to the input signal can always be obtained. On the other hand, if the signal inverter 29 is adapted to invert the signal output from the low pass filter 28 only when the number of delay stages of the analog FIFO memory 10 is an odd number, an output signal having inverted phase with respect to the input signal can always be obtained.

Figure 9:
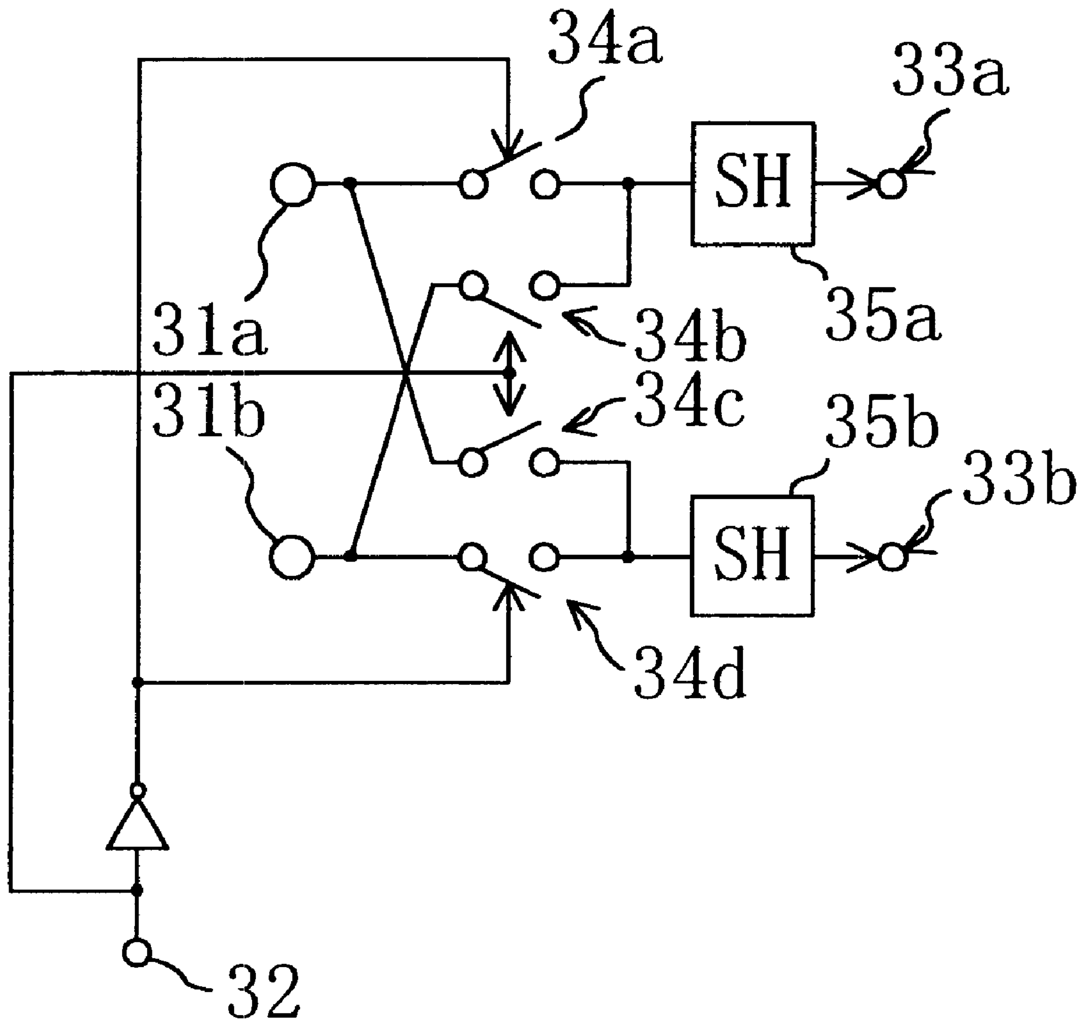
FIG. 9 is a diagram showing an exemplary circuit used as a signal inverter, instead of the analog multiplier, as the analog FIFO memory processes analog differential signals.

Furthermore, in this embodiment, if the analog FIFO memory processes analog differential signals, a signal inverter circuit having a simple configuration such as that shown in FIG. 9 may be used instead of the analog multiplier 21, 26. In FIG. 9, the reference numerals 31*a* and 31*b* denote signal input terminals; 32 denotes a control signal input terminal; 33*a* and 33*b* denote signal output terminals; 34*a*, 34*b*, 34*c*, 34*d* denotes switches; 35*a*, 35*b* denotes sample and hold (SH) circuits. In non-inverting a signal, the switches 34*a*, 34*d* are turned ON, the switches 34*b*, 34*c* are turned OFF and the signal is input to the sample and hold circuits 35*a*, 35*b*. On the other hand, in inverting a signal, the switches 34*b*, 34*c* are turned ON, the switches 34*a*, 34*d* are turned OFF and the signal having inverted polarity is input to the sample and hold circuits 35*a*, 35*b*. Turning of the switches 34*a* to 34*d* is controlled in response to the control signal input through the terminal 32. By utilizing such a simple configuration, the polarities of the signals output through the signal output terminals 33*a*, 33*b* can be inverted at predetermined times.

Embodiment 2

In the second embodiment of the present invention, the chopper operation described in the first embodiment is applied to an analog FIFO memory device having a parallel configuration.

Figure 10A:
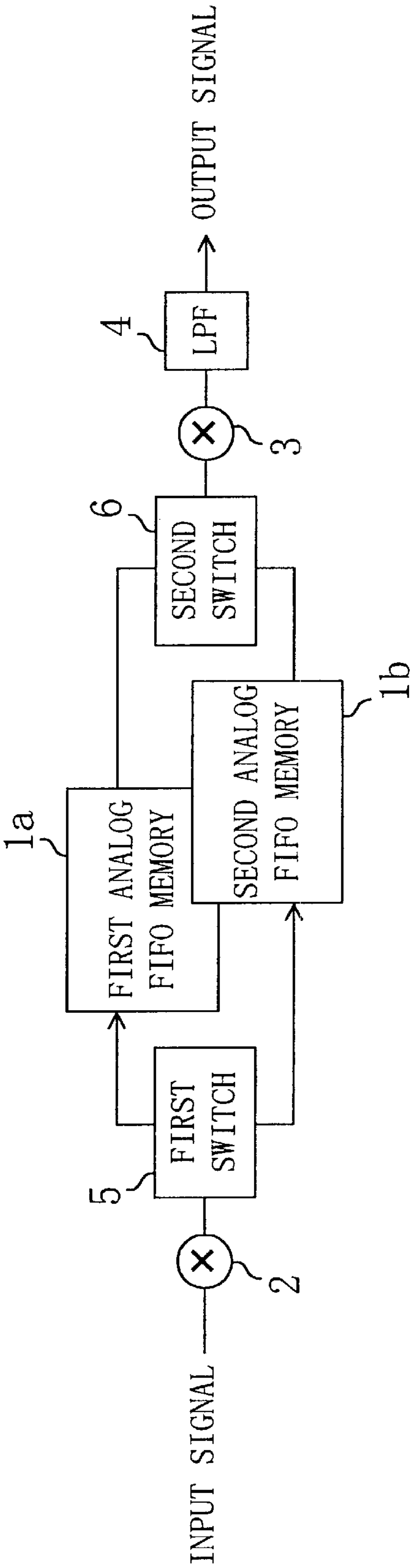
FIGS. 10A and 10B illustrate an exemplary application of a chopper operation, described in the first embodiment, to an analog FIFO memory device having a parallel configuration.
Figure 10B:
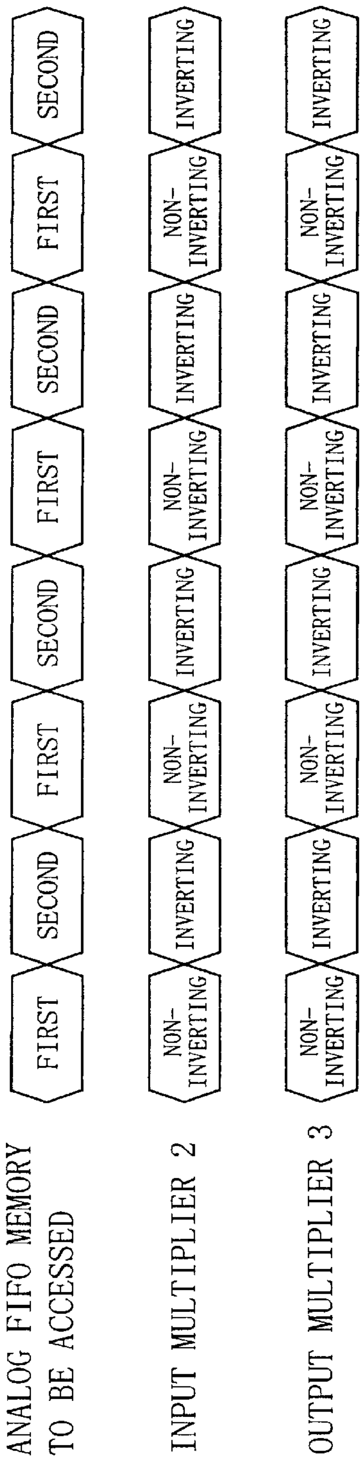

FIGS. 10A and 10B illustrate an exemplary application of the chopper operation, described in the first embodiment, to an analog FIFO memory device having a parallel configuration.

FIG. 10A is a diagram illustrating a schematic arrangement thereof, and FIG. 10B is a timing chart illustrating correspondence between a memory to be accessed and the operations of multipliers in the analog FIFO memory device shown in FIG. 10A. The analog FIFO memory device shown in FIG. 10A includes a first analog FIFO memory 1*a* and a second analog FIFO memory 1*b*. By making a first switching section 5 and a second switching section 6 switch the input/output of signals, read-modify-write operations are alternately performed on the first analog FIFO memory 1*a* and the second analog FIFO memory 1*b*. By cyclically operating a plurality of analog FIFO memories, an analog FIFO memory device having a parallel configuration can reduce the operating speed required for each analog FIFO memory.

An analog FIFO memory device having such a parallel configuration is usually formed by using an even number of analog FIFO memories. In such a case, if non-inverting and inverting are alternately performed through the chopper operation described in the first embodiment, the operation performed on one of analog FIFO memories is always the same as the operation performed on any of the other analog FIFO memories. For example, as shown in FIG. 10B, while the first analog FIFO memory 1*a* is being accessed, non-inverting is always being performed by the input multiplier 2 and the output multiplier 3. On the other hand, while the second analog FIFO memory 1*b* is being accessed, inverting is always being performed by the input multiplier 2 and the output multiplier 3.

Thus, if the chopper operation is employed in an analog FIFO memory device having a parallel configuration including an even number of analog FIFO memories, the respective analog FIFO memories perform the same type of operation, i.e., non-inverting or inverting, on the input/output signals during each clock period. Thus, it is not necessary to alternately switch non-inverting and inverting with respect to the input/output signals every clock period. In other words, even when no means is employed for alternately performing non-inverting and inverting, processing equivalent to the chopper operation can be performed.

Figure 11:
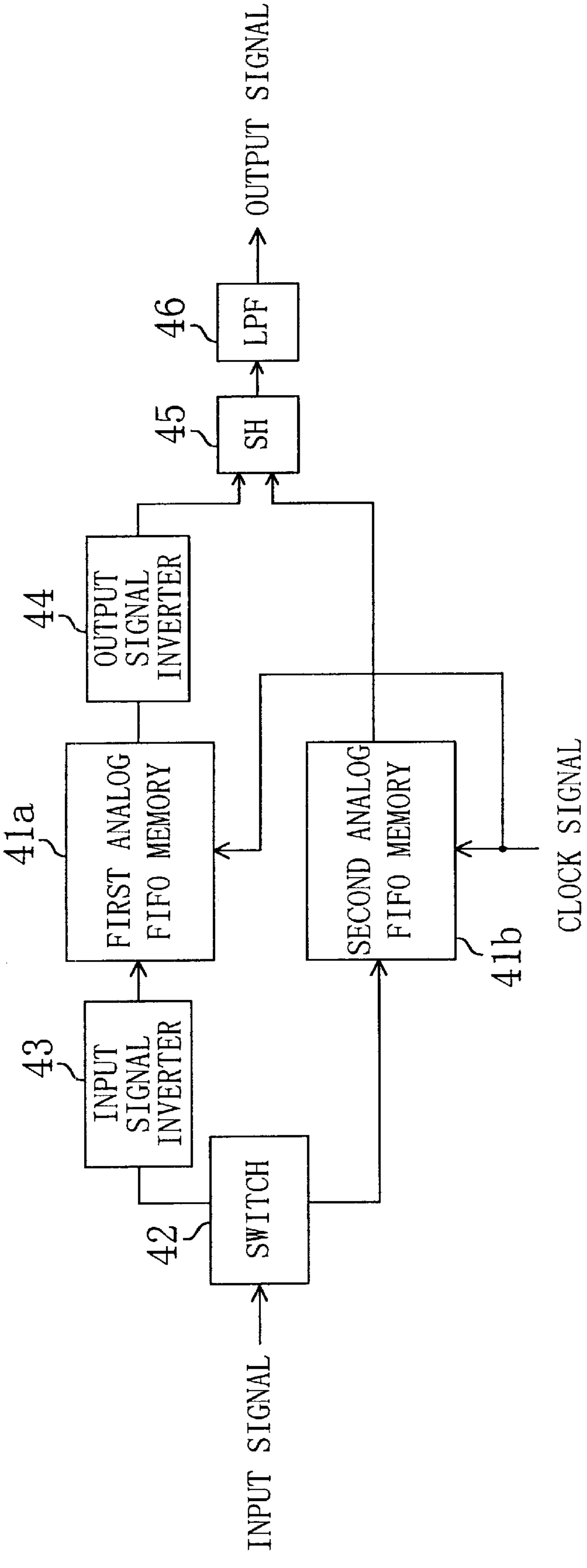
FIG. 11 is a diagram showing an arrangement of the analog FIFO memory device in the second embodiment of the present invention, in which a chopper operation is implemented in an analog FIFO memory device having a parallel configuration without using any multiplier.

FIG. 11 is a diagram showing an arrangement of the analog FIFO memory device in the second embodiment. In FIG. 11, a chopper operation is implemented in an analog FIFO memory device having a parallel configuration without using any means, such as an analog multiplier, for alternately performing non-inverting and inverting. In FIG. 11, the reference numerals 41*a* and 41*b* denote first and second analog FIFO memories. Each of the analog FIFO memories 41*a*, 41*b* has substantially the same configuration as that of the analog FIFO memory 10 of the analog FIFO memory device shown in FIG. 5. The reference numeral 42 denotes a switching section for selectively providing an input signal to the first analog FIFO memory 41*a* or the second analog FIFO memory 41*b*. The reference numeral 43 denotes an input signal inverter for inverting the input signal and then inputting the inverted signal to the first analog FIFO memory 41*a*. The reference numeral 44 denotes an output signal inverter for inverting the signal output from the first analog FIFO memory 41*a*. The reference numeral 45 denotes a sample and hold circuit. And the reference numeral 46 denotes a low pass filter.

Hereinafter, the operation of the analog FIFO memory device shown in FIG. 11 will be described. An input signal is selectively provided by the switching section 42 either to the first analog FIFO memory 41*a* or the second analog FIFO memory 41*b*. The first and the second analog FIFO memories 41*a*, 41*b* are driven in response to a clock signal. When the input signal is selectively provided by the switching section 42 to the input signal inverter 43, the signal is inverted by the input signal inverter 43 and then the inverted signal is input to the first analog FIFO memory 41*a*. On the other hand, when the input signal is selectively provided by the switching section 42 to the second analog FIFO memory 41*b*, the signal is directly input to the second analog FIFO memory 41*b*.

The output signal of the first analog FIFO memory 41*a* is inverted by the output signal inverter 44 and then the inverted signal is input to the sample and hold circuit 45. On the other hand, the output signal of the second analog FIFO memory 41*b* is directly input to the sample and hold circuit 45. The sample and hold circuit 45 alternately samples, holds and outputs the output signals of the first and the second analog FIFO memories 41*a* and 41*b*. In such an arrangement, the fixed pattern noise generated in the first analog FIFO memory 41*a* is inverted and then output, whereas the fixed pattern noise generated in the second analog FIFO memory 41*b* is directly output.

Thus, if the first and the second analog FIFO memories 41*a* and 41*b* are designed on an LSI by using a common layout pattern and the fixed pattern noises generated therefrom are substantially the same, then the fixed pattern noise input to the low pass filter 46 is output with the sign thereof inverted in response to every operating clock. That is to say, since the frequency of the fixed pattern noise is modulated to be higher, the fixed pattern noise can be removed easily by the low pass filter 46.

In other words, in this embodiment, by providing the input signal inverter 43 only on the input side of the first analog FIFO memory 41*a*, not on the input side of the second analog FIFO memory 41*b*, the same function as that of the input transformer 20 in the analog FIFO memory device shown in FIG. 5 is realized. In addition, by providing the output signal inverter 44 only on the output side of the first analog FIFO memory 41*a*, not on the output side of the second analog FIFO memory 41*b*, the same function as that of the output transformer 25 in the analog FIFO memory device shown in FIG. 5 is realized. In this embodiment, since various means for alternately performing non-inverting and inverting, such as frequency dividers and analog multipliers, are not necessary, the circuit configuration can be simplified.

The input signal inverter 43 may be provided either for the input side of the first analog FIFO memory 41*a* or that of the second analog FIFO memory 41*b*. Similarly, the output signal inverter 44 may be provided either for the output side of the first analog FIFO memory 41*a* or that of the second analog FIFO memory 41*b*.

In this embodiment, the number of analog FIFO memories is set at two. However, in general, a chopper operation is realized by utilizing a similar arrangement so long as the analog FIFO memory device includes an even number of analog FIFO memories. That is to say, input and output signal inverters need to be selectively provided for every other one of the even number of analog FIFO memories on the input and output sides thereof in accordance with an order of access. By utilizing such an arrangement, the chopper operation is also realized without using any means for alternately performing non-inverting and inverting.

Embodiment 3

In the third embodiment of the present invention, the arrangement of the second embodiment for realizing a chopper operation in an analog FIFO memory device having a parallel configuration without using any means for alternately performing non-inverting and inverting is applied to an analog FIFO memory storing an analog differential signal therein and operating per se.

Figure 12:
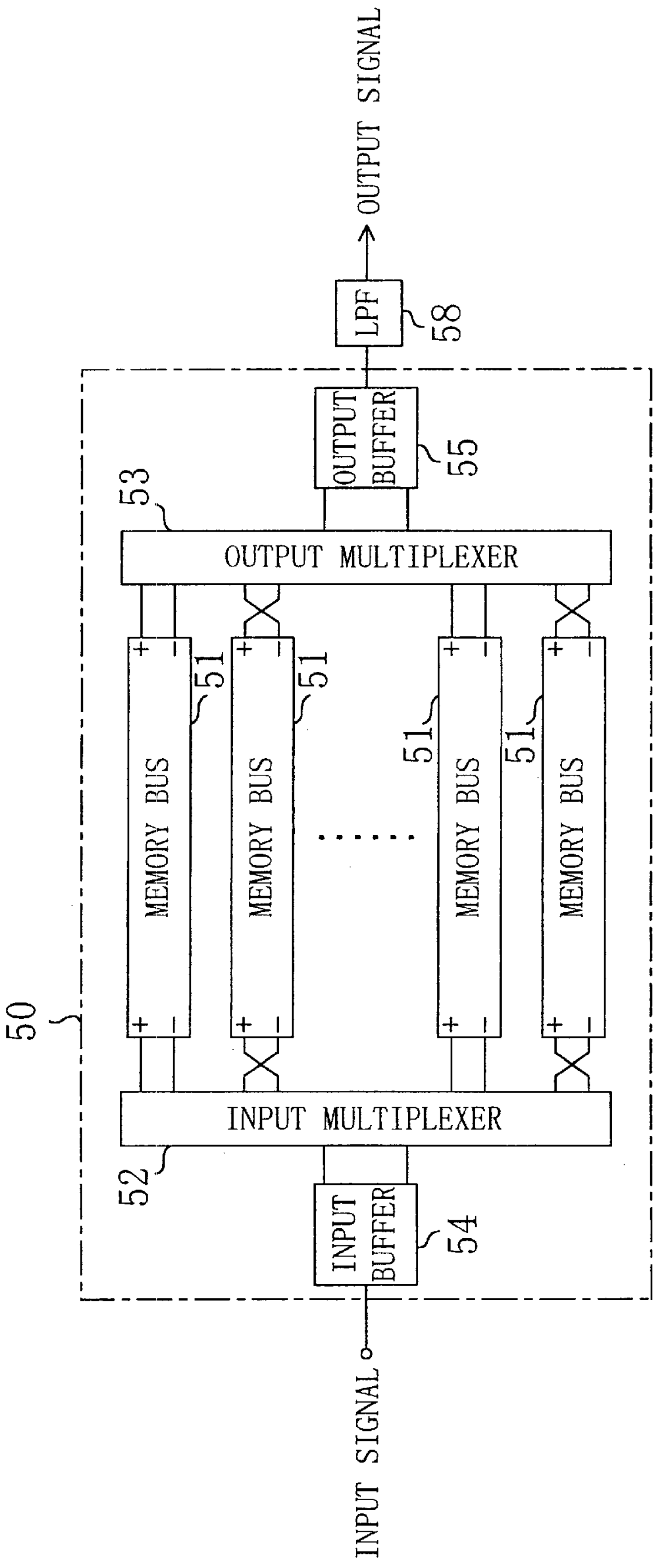
FIG. 12 is a diagram showing an arrangement of the analog FIFO memory device in the third embodiment of the present invention.

FIG. 12 is a diagram showing an arrangement of the analog FIFO memory device in the third embodiment. In FIG. 2, an analog FIFO memory 50 is adapted to store an analog inferential signal therein. The analog FIFO memory 50 includes: an even number of memory buses 51, in each of which a plurality of memory cells are connected; an input multiplexer 52; and output multiplexer 53; an input buffer 54; and an output buffer 55. The input multiplexer 52 selects one of the memory buses 51 and inputs a signal to the selected memory bus 51 via the input buffer 54. The output multiplexer 53 selects one of the memory buses 51, reads a signal from the selected memory bus 51 and then outputs the read signal to the output buffer 55. In FIG. 12, the illustration of a counter for counting externally provided clock signals and for specifying a memory cell to/from which a signal is written/read is omitted. The illustration of address decoders for addressing the memory buses and the memory cells is also omitted. The reference numeral 58 denotes a low pass filter for removing high frequency components from an output signal of the analog FIFO memory 50.

The analog FIFO memory 50 shown in FIG. 12 is characterized in that the connection between non-inverting and inverting input terminals of an odd-numbered memory bus 51 and associated output terminals of the input multiplexer 52 is inverse of the connection between non-inverting and inverting input terminals of an even-numbered memory bus 51 and associated output terminals of the input multiplexer 52. In a similar manner, the connection between non-inverting and inverting output terminals of an odd-numbered memory bus 51 and associated input terminals of the output multiplexer 53 is inverse of the connection between non-inverting and inverting output terminals of an even-numbered memory bus 51 and associated input terminals of the output multiplexer 52. In actuality, the input/output terminals of the memory buses 51 are laid out alternately and inversely bus by bus.

Thus, the fixed pattern noise generated in an odd-numbered memory bus 51 is directly output, whereas the fixed pattern noise generated in an even-numbered memory bus 51 is inverted and then output.

Accordingly, if the analog FIFO memory 50 is addressed vertically to the memory buses 51 as shown in FIG. 7A, then the sign of the fixed pattern noise to be output is inverted with respect to every clock. In other words, if the fixed pattern noise has been generated inside each memory bus 51, the frequency of the fixed pattern noise can be modulated to be higher by alternately inverting the layouts of the respective memory buses 51. Consequently, as in the second embodiment, the low pass filter 58 can easily remove the fixed pattern noise.

That is to say, in this embodiment, by connecting the input multiplexer 52 to the respective memory buses 51 such hat an analog differential signal is non-inverted and input o an odd-numbered memory bus 51 and inverted and input to an even-numbered memory bus 51, the same function as that of the input transformer 20 in the analog FIFO memory device shown in FIG. 5 is realized. In addition, by connecting the output multiplexer 53 to the respective memory buses 51 such that an analog differential signal is non-inverted and output from an odd-numbered memory bus 51 and inverted and output from an even-numbered memory bus 51, the same function as that of the output transformer 25 in the analog FIFO memory device shown in FIG. 5 is realized. Thus, since various means for alternately performing non-inverting and inverting, such as frequency dividers and analog multipliers, are not necessary, the circuit configuration can be simplified.

It is noted that the connection among the respective memory buses 51, the input multiplexer 52 and the output multiplexer 53 is not limited to that described in this embodiment. For example, the input multiplexer 52 may be connected to the respective memory buses 51 such that an analog differential signal is inverted and input to an odd-numbered memory bus 51 and non-inverted and input to an even-numbered memory bus 51. Also, the output multiplexer 53 may be connected to the respective memory buses 51 such that an analog differential signal is inverted and output from an odd-numbered memory bus 51 and non-inverted and output from an even-numbered memory bus 51. In other words, so long as the respective memory buses 51 are connected to the input multiplexer 52 such that analog differential signals are non-inverted and input to the buses every other input signal and to the output multiplexer 53 such that analog differential signals are inverted and output from the buses every other output signal, the chopper operation is realized without using any means for alternately performing non-inverting and inverting.

Embodiment 4

The analog FIFO memory device in the fourth embodiment of the present invention is supposed to be applied for delaying a TV signal. For that purpose, the analog FIFO memory device of the first embodiment is adapted such that the fixed pattern noise is invisible on the TV image by utilizing the human visual sense. That is to say, this embodiment is intended for visually eliminating the influence of the fixed pattern noise on the signals and uses the chopper operation for that purpose as in the first embodiment.

Figure 13A:
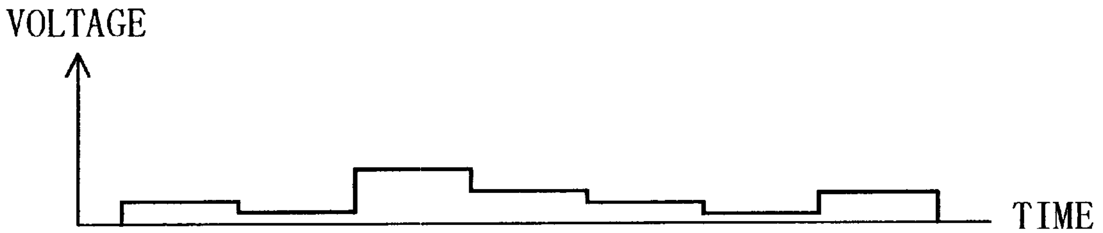
FIGS. 13A and 13B are diagrams illustrating the principles of visually eliminating the influence of the fixed pattern noise by means of a chopper operation in the fourth embodiment of the present invention.
Figure 13B:
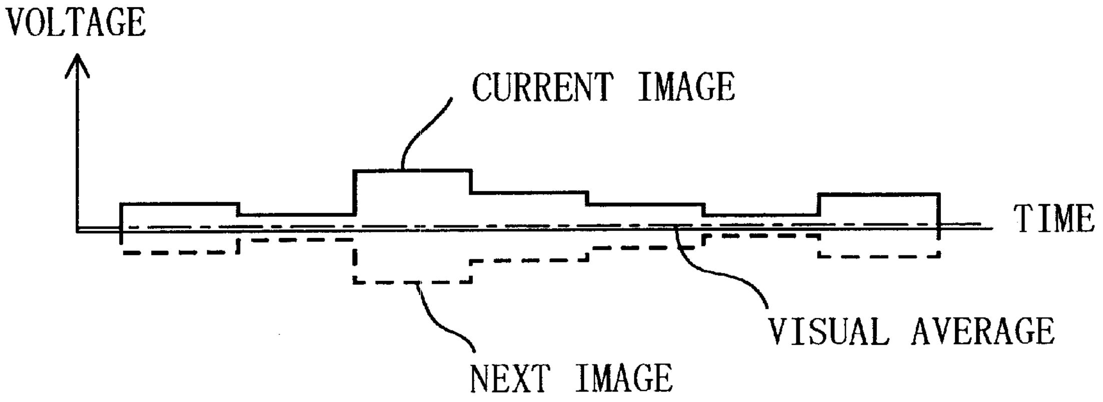

FIGS. 13A and 13B are diagrams illustrating the principles of visually eliminating the influence of the fixed pattern noise by means of a chopper operation. FIG. 13A illustrates the waveform of fixed pattern noise with no chopper operation performed, and FIG. 13B illustrates the waveform of fixed pattern noise with a chopper operation performed in this embodiment.

In this embodiment, the chopper operation is performed in synchronism with the times when the TV image is refreshed, and the period of the chopper operation is synchronized with the period of the vertical synchronizing signal of the TV image. Thus, as shown in FIG. 13B, the polarity of the fixed pattern noise component is inverted every time the image is refreshed. In FIG. 13B, the solid line represents the fixed pattern noise on a current image and the broken line represents the fixed pattern noise on the next image. When the polarity of the fixed pattern noise component is thus inverted every time the image is refreshed, the visual average of the fixed pattern noise becomes zero as represented by the one-dot chain in FIG. 13B. That is to say, since the fixed pattern noise is filtered because of the human visual sense and becomes invisible to the human eyes, it is possible to visually eliminate the influence of the fixed pattern noise.

As can be understood, by modulating the fixed pattern noise appearing on the TV image with too high a frequency to be visually perceived by the human eyes, this embodiment visually eliminates the influence of the fixed pattern noise.

Figure 14:
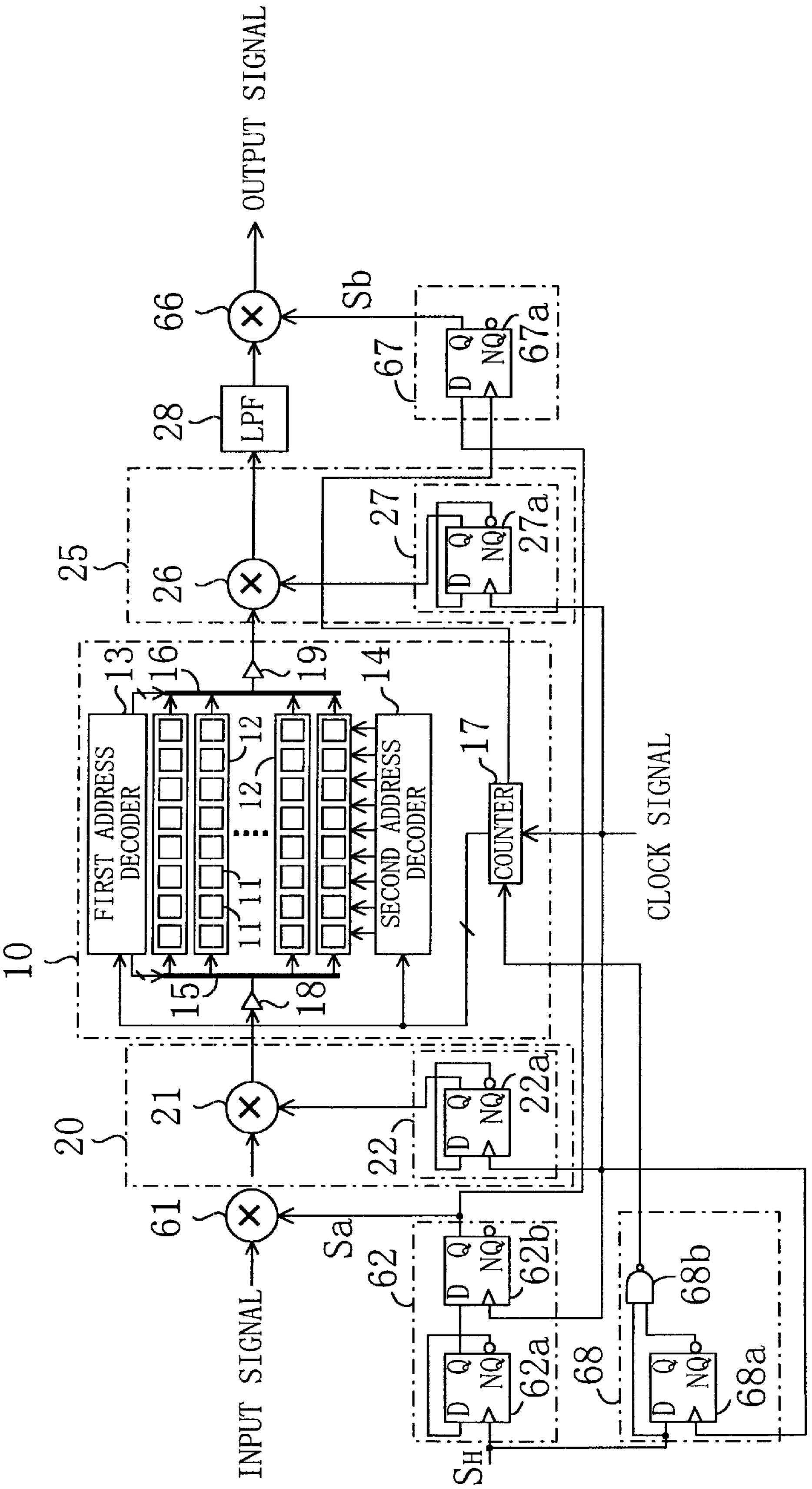
FIG. 14 is a diagram showing a circuit configuration of the analog FIFO memory device in the fourth embodiment of the present invention.

FIG. 14 is a diagram showing a circuit configuration of the analog FIFO memory device in the fourth embodiment. In FIG. 14, the components commonly used between the analog FIFO memory device shown in FIG. 5 and the present analog FIFO memory device are identified by the same reference numerals. The reference numeral 61 denotes a third analog multiplier. The reference numeral 62 denotes a first controller for receiving a vertical synchronizing signal SH and a clock signal driving the analog FIFO memory 10 and for generating and outputting a first control signal Sa for controlling the third analog multiplier 61. The reference numeral 66 denotes a fourth analog multiplier. The reference numeral 67 denotes a second controller for receiving the first control signal Sa and for generating and outputting a second control signal Sb for controlling the fourth analog multiplier 66. The reference numeral 68 denotes a third controller for receiving the vertical synchronizing signal SH and the clock signal and for controlling the resetting operation of the counter 17.

Hereinafter, the operation of the analog FIFO memory device shown in FIG. 14 will be described.

The first controller 62 makes a D flip-flop 62*a* generate a signal for switching non-inverting and inverting of the third analog multiplier 61 in response to the vertical synchronizing signal SH. Then, the first controller 62 makes a D flip-flop 62*b* latch this signal in response to the clock signal and then inputs the signal as the first control signal Sa to the third analog multiplier 61. The signal input to the analog FIFO memory device is firstly modulated by the third analog multiplier 61 with a frequency of the vertical synchronizing signal SH in accordance with the first control signal Sa. The input signal modulated by the third analog multiplier 61 is input to the first analog multiplier 21. The first analog multiplier 21 modulates the signal with half of the frequency of the clock signal driving the analog FIFO memory 10 and then inputs the modulated signal to the analog FIFO memory 10.

The output signal of the analog FIFO memory 10 is firstly modulated by the second analog multiplier 26 with half of the frequency of the clock signal driving the analog FIFO memory 10 and then the high frequency components thereof are removed by the low pass filter 28. The signal with the high frequency components removed is modulated by the fourth analog multiplier 66 with the frequency of the vertical synchronizing signal SH in accordance with the second control signal Sb.

In this case, the operation applied on the input signal of the analog FIFO memory device by the third analog multiplier 61 is inverse of the operation applied on the output signal thereof by the fourth analog multiplier 66. Similarly, as described in the first embodiment, the operation applied on the input signal by the first analog multiplier 21 is also inverse of the operation applied on the output signal by the second analog multiplier 26. Thus, the input signal of the analog FIFO memory device is delayed for a time corresponding to the number of delay stages of the analog FIFO memory 10 and finally output with the same waveform as that of the input signal, without being modified in any way by the first to the fourth analog multipliers 21, 26, 61, 66.

By contrast, since the fixed pattern noise generated inside the analog FIFO memory 10 is modulated by the second analog multiplier 26, the frequency thereof is shifted to be higher and thus the frequency components thereof are removed by the low pass filter 28. Moreover, since the fixed pattern noise generated inside the analog FIFO memory 10 is inverted by the fourth analog multiplier 66 every time the image is refreshed, only the average of the fixed pattern noise is visible on the TV image. As a result, the influence of the fixed pattern noise is visually eliminated.

It is noted that the delay between input and output signals corresponds to the delay of the analog FIFO memory 10.

Thus, in order to accurately restore the output signal into the original input signal, it is necessary to provide the second control signal Sb to the fourth analog multiplier 66 later than the input of the first control signal Sa by the delay of the analog FIFO memory 10. Accordingly, a signal is output from the counter 17 in synchronism with the cyclic period thereof. In response to this signal, the second controller 67 outputs the second control signal Sb at a point in time later than the input of the first control signal Sa by the delay of the analog FIFO memory 10.

Figure 15:
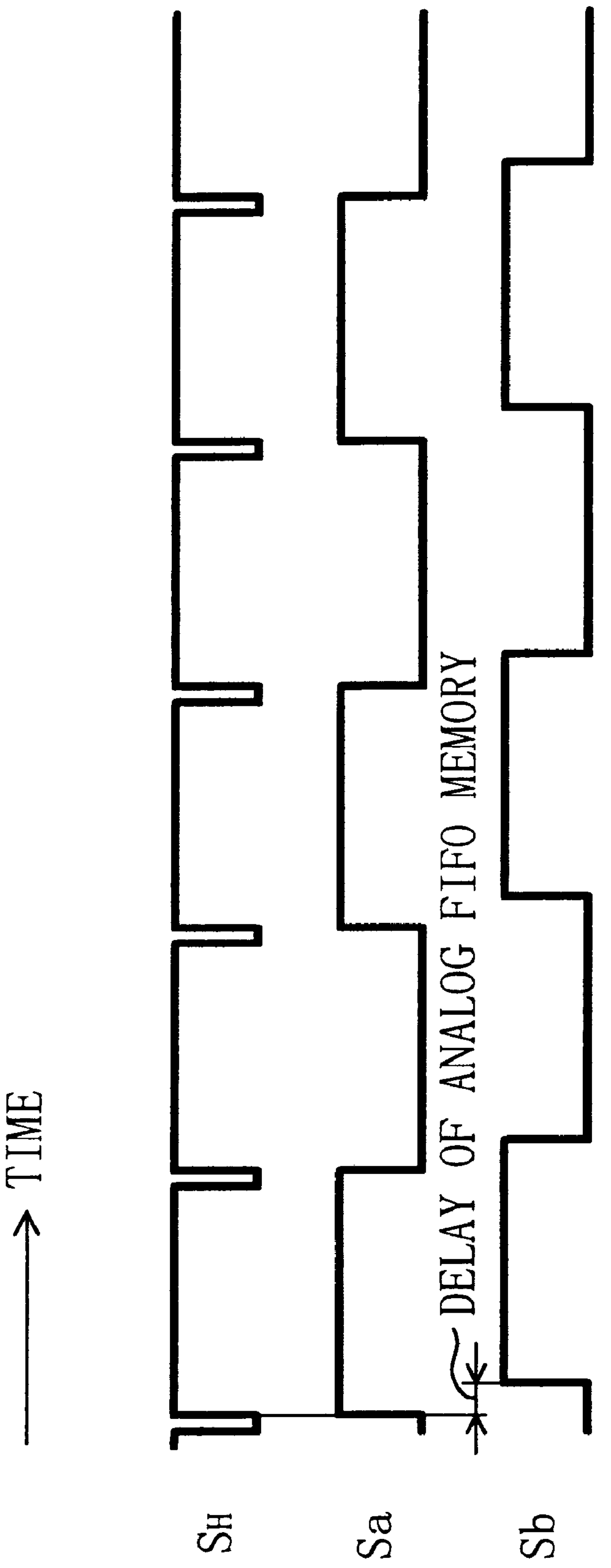
FIG. 15 is a signal waveform chart showing the timing relationship among a vertical synchronizing signal SH of a TV image, a first control signal Sa and a second control signal Sb in the analog FIFO memory device shown in FIG. 14.

FIG. 15 is a signal waveform chart showing the timing relationship among the vertical synchronizing signal SH, the first control signal Sa and the second control signal Sb. As shown in FIG. 15, the leading/trailing edge of the second control signal Sb is later than that of the first control signal Sa by the delay of the analog FIFO memory 10. This is because the signal output of the analog FIFO memory 10 is later than the input thereof by the delay of the analog FIFO memory 10. Thus, it is necessary for the fourth analog multiplier 66 to start the multiplication at a time later than the start of the multiplication by the third analog multiplier 61 by the delay of the analog FIFO memory 10.

The high frequency components of the output signal of the analog FIFO memory 10 are removed by the low pass filter 28 and then the output signal is alternately non-inverted and inverted by the fourth analog multiplier 66 in accordance with the logic levels of the second control signal Sb. Thus, the output signal is completely restored into the originally input signal.

Figure 16A:
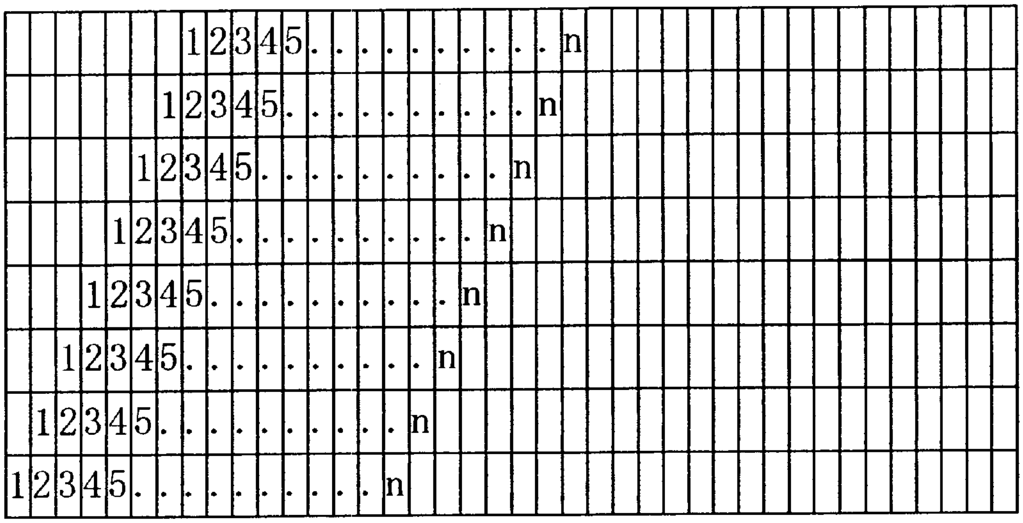
FIGS. 16A and 16B are diagrams showing the correspondence between pixels of a TV image and addresses of an analog FIFO memory.
Figure 16B:
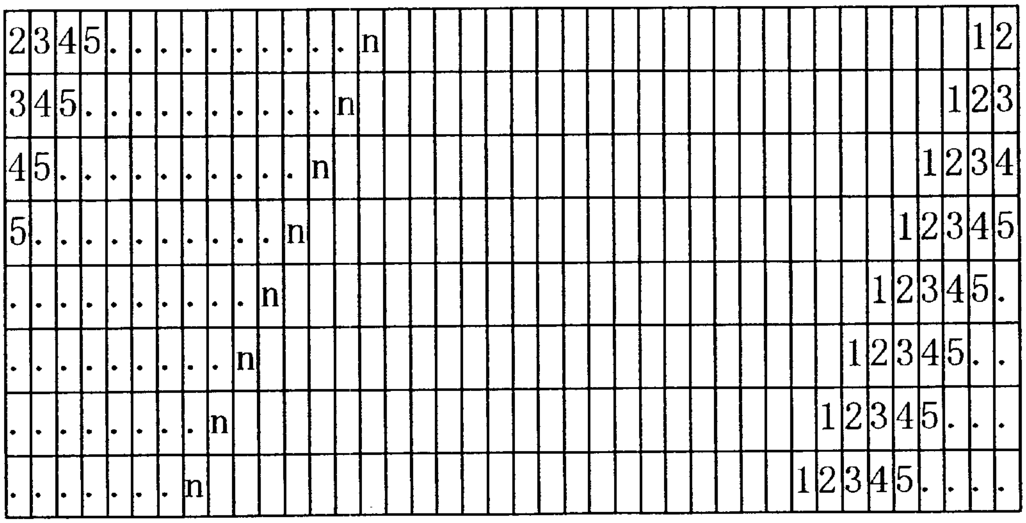

Furthermore, in order to perform the chopper operation of this embodiment more effectively, the location on the image at which the fixed pattern noise is generated is preferably fixed. FIGS. 16A and 16B are diagrams showing correspondence between pixels of a TV image and addresses of the analog FIFO memory. In general, the delay of an analog FIFO memory is not synchronized with the horizontal line period on the TV image. Thus, as shown in FIGS. 16A and 16B, every time the image is refreshed, the addresses of the analog FIFO memory corresponding to the pixels on the TV image are varied. As a result, the fixed pattern noise is observed on the TV image as if it were flowing every time the image is refreshed.

In order to eliminate such a problem, a third controller 68 including a D flip-flop 68*a* and a NAND gate 68*b* is provided in this embodiment. In response to the vertical synchronizing signal SH, the third controller 68 generates a signal for resetting the counter 17, thereby resetting the counter 17 in synchronism with the vertical synchronizing signal SH. Since the location on the image at which the fixed pattern noise is generated can be fixed by performing such an operation, the influence of the fixed pattern noise can be visually eliminated with certainty.

In this embodiment, the copper operation is performed in combination with the first embodiment. Alternatively, even when the chopper operation is performed per se, sufficient effects of visually eliminating the influence of the fixed pattern noise can also be attained.

Figure 17:
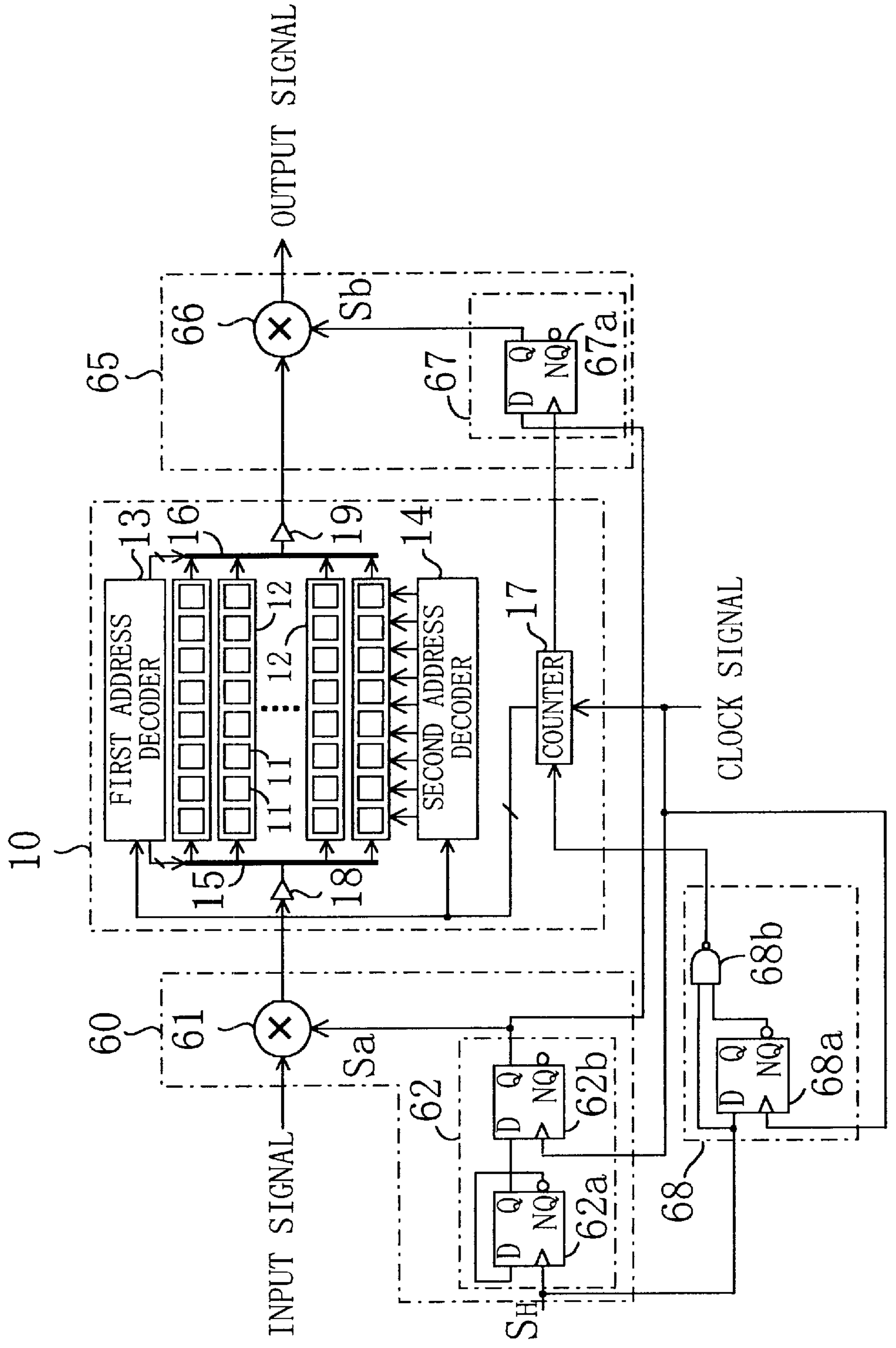
FIG. 17 is a diagram showing a variant of the analog FIFO memory device in the fourth embodiment of the present invention, including a configuration adapted to perform the chopper operation specific to the fourth embodiment by itself.

FIG. 17 is a diagram showing a variant of the analog FIFO memory device in the fourth embodiment, including such a configuration as to perform the chopper operation of the fourth embodiment per se. As can be seen from the comparison between FIGS. 17 and 14, the first and the second analog multipliers 21, 26, the first and the second frequency dividers 22, 27 and the low pass filter 28 are omitted. The input signal modulated by the third analog multiplier 61 is input to the analog FIFO memory 10 and the output signal of the analog FIFO memory 10 is directly input to the fourth analog multiplier 66. The input transformer 60 is constituted by the third analog multiplier 61 and the first controller 62, while the output transformer 65 is constituted by the fourth analog multiplier 66 and the second controller 67. By utilizing the configuration shown in FIG. 17, the fixed pattern noise can be visually eliminated from the TV image.

Embodiment 5

The fifth embodiment of the present invention makes the fixed pattern noise invisible on the TV image by utilizing the human visual sense as in the fourth embodiment. By externally controlling the times when the counter 17 is reset, the same effects as those attained by the chopper operation of the fourth embodiment are also attained in this embodiment.

Figure 18:
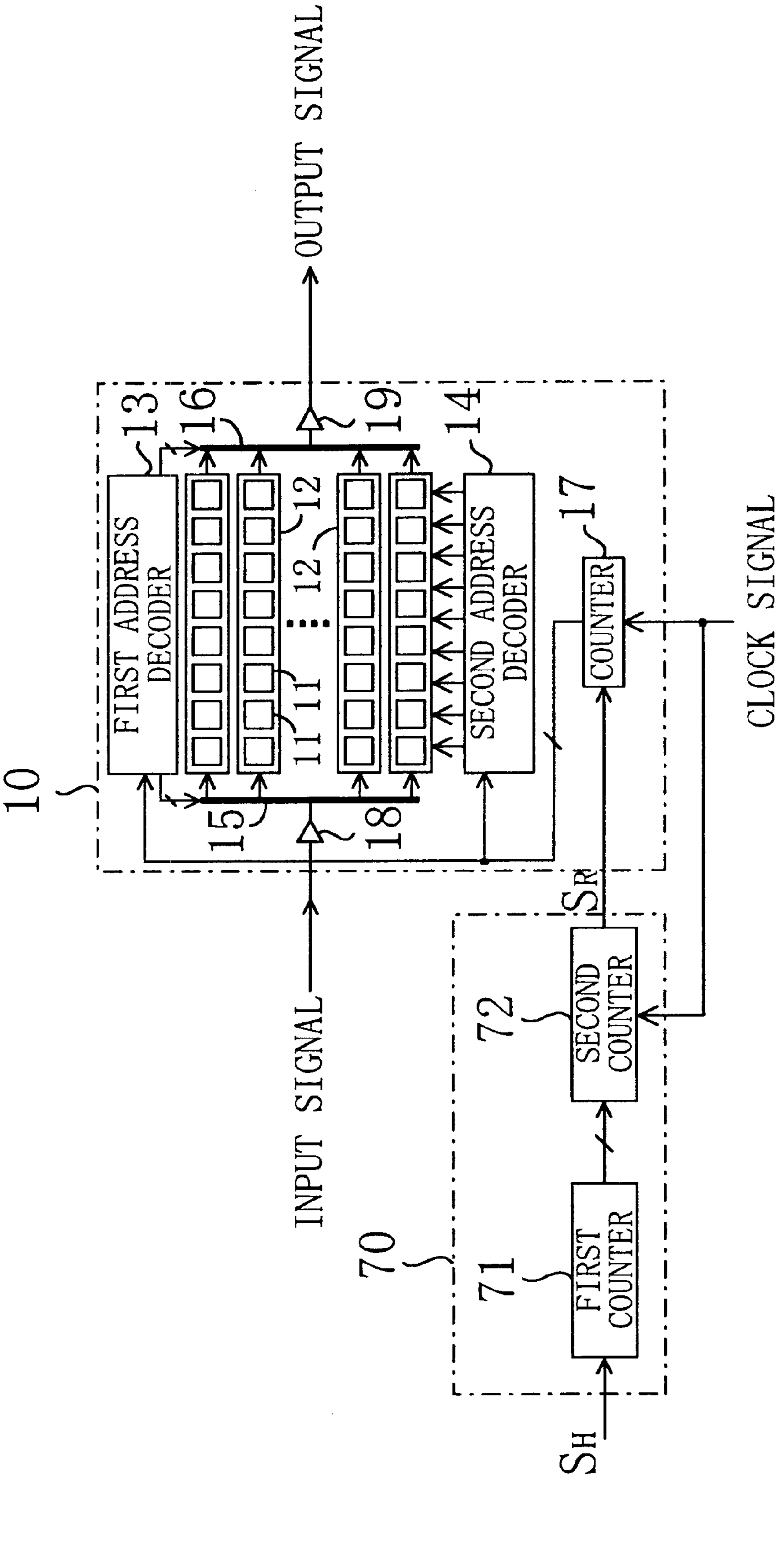
FIG. 18 is a diagram showing an arrangement of the analog FIFO memory device in the fifth embodiment of the present invention.

FIG. 18 is a diagram showing an arrangement of the analog FIFO memory device in the fifth embodiment. In FIG. 18, the components commonly used between the analog FIFO memory device shown in FIG. 5 and the present analog FIFO memory device are identified by the same reference numerals. The reference numeral 71 denotes a first counter for counting the number of leading or trailing edges of the vertical synchronizing signal SH. The reference numeral 72 denotes a second counter for counting the clock signals driving the analog FIFO memory 10 and for resetting the counter 17 when the value of the counter 72 reaches the upper limit value corresponding to the counted value of the counter 71. A resetting section is constituted by the first counter 71 and the second counter 72.

Figure 19:
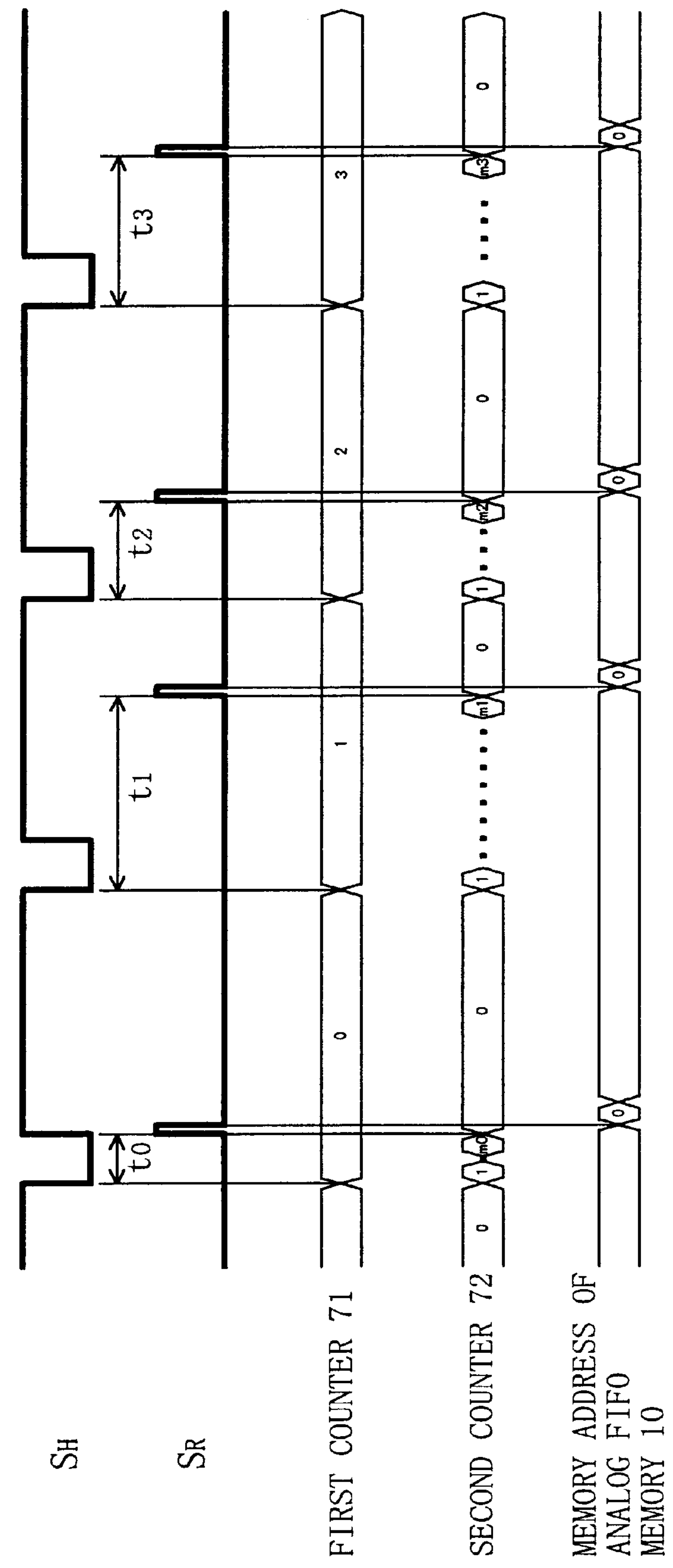
FIG. 19 is a timing chart showing the operations of the analog FIFO memory device shown in FIG. 18.

FIG. 19 is a timing chart showing the operations of the analog FIFO memory device shown in FIG. 18. As shown in FIG. 19, the first counter 71 counts the number of trailing edges of the vertical synchronizing signal SH. The upper limit of the counted value of the second counter 72 is set based on the counted value of the first counter 71. In FIG. 19, the upper-limit counted values of the second counter 72 are set for the respective counted values of the first counter 71 as follows: "m0" for "0", "m1" for "1", "m2" for "2" and "m3" for "3". The second counter 72 counts the number of clock signals driving the analog FIFO memory 10 and activates a reset signal SR when the counted value reaches the upper limit set in accordance with the counted value of the first counter 71, thereby resetting the counter 17. Thus, the time interval between each trailing edge of the vertical synchronizing signal SH and the corresponding leading edge of the reset signal SR becomes different every time the TV image is refreshed (i.e., time intervals t0, t1, t2, t3).

As a result of such operations, the relationship between the pixels of the TV image and positions of the memory addresses of the analog FIFO memory 10 specified by the counter 17 deviate in accordance with the counted values of the first counter 17 every time the image is refreshed. In other words, the fixed pattern noise is modulated every time the image is refreshed, and the first counter 17 plays the role of setting a modulation mode for the fixed pattern noise every time the image is refreshed. Thus, if this modulation uses a visually appropriate frequency, then the fixed pattern noise is averaged and becomes invisible to the human eyes on the TV image. As a result, the fixed pattern noise can be visually eliminated.

Embodiment 6

Figure 20:
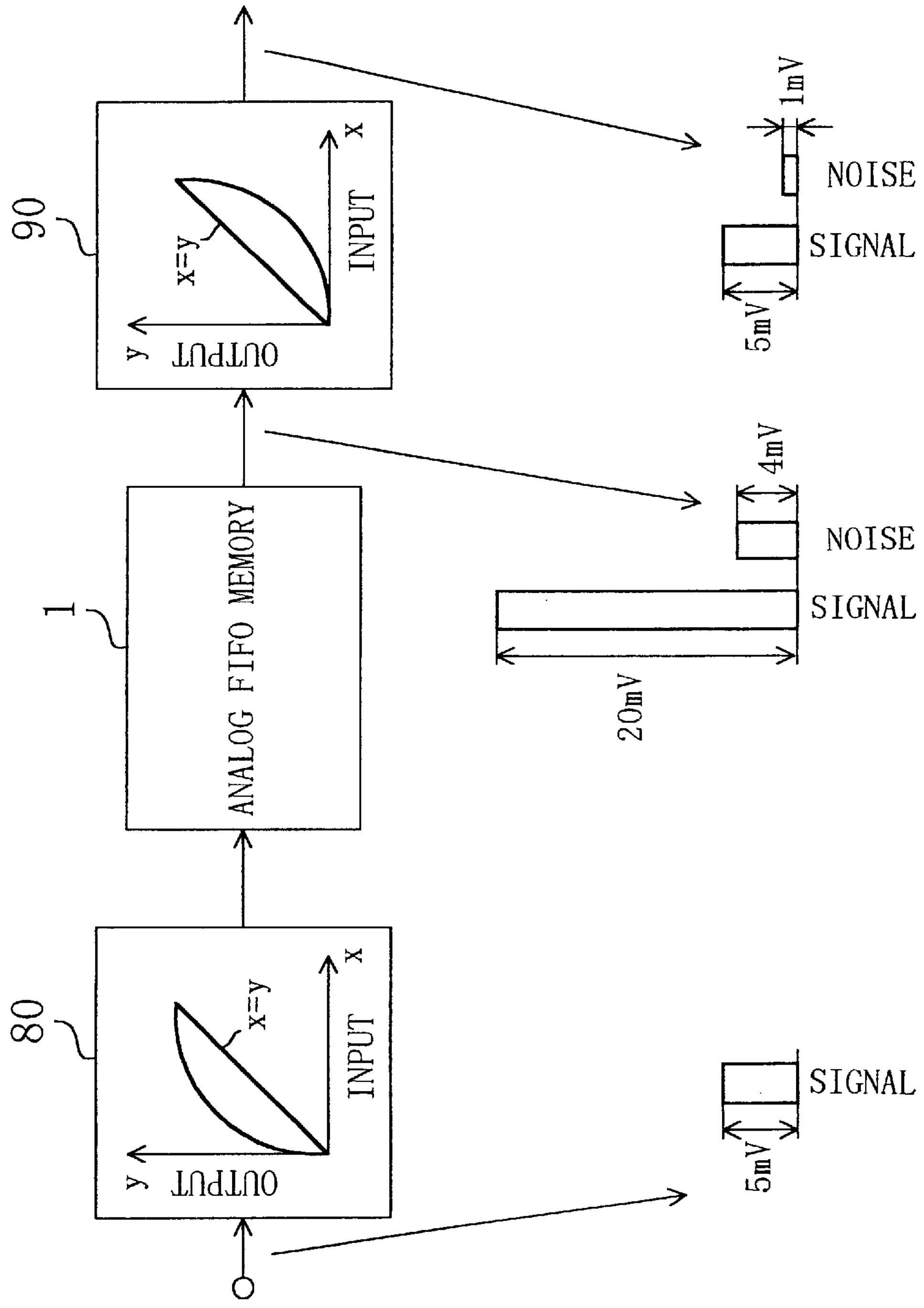
FIG. 20 is a diagram showing a schematic arrangement of the analog FIFO memory device in the sixth embodiment of the present invention.

FIG. 20 is a diagram showing a schematic arrangement of the analog FIFO memory device in the sixth embodiment of the present invention. In the sixth embodiment, the level of the fixed pattern noise is relatively reduced with respect to a signal level by utilizing a voltage transformation.

Various types of noises such as fixed pattern noise are particularly noticeable if the intensity of the signal itself to be overlapped is small. Thus, if the input signal is small, the fixed pattern noise needs to be suppressed correspondingly. Accordingly, if the input signal is small, then the level of the fixed pattern noise generated inside the analog FIFO memory 10 can be lowered by raising once the level of the input signal during preprocessing, inputting the signal to the analog FIFO memory 10 and then lowering the level of the output signal of the analog FIFO memory 10 to the original level during the post-processing.

Specifically, as shown in FIG. 20, a nonlinear expander 80 for performing nonlinear expansion by using a logarithmic function or the like is provided as an input transformer on the input side of the analog FIFO memory 10. Also, a nonlinear compressor 90 for performing nonlinear compression by using an exponential function or the like is provided as an output transformer on the output side thereof. Then, the fixed pattern noise generated inside the analog FIFO memory 10 can be compressed. The nonlinear expansion performed by the nonlinear expander 80 may be any arbitrary one so long as such a function that an output y becomes larger than a function x=y with respect to an input x is satisfied. On the other hand, the nonlinear compressor 90 needs to be a circuit for realizing an inverse function of the function of the expansion performed by the nonlinear expander 80.

In the analog FIFO memory 10 shown in FIG. 20, the level of the input signal is raised in the low-level region by the nonlinear expander 80 and then the signal is input to the analog FIFO memory 1. Conversely, the level of the output signal of the analog FIFO memory 1 is lowered in the low-level region by the nonlinear compressor 90.

For example, assume that the level of the fixed pattern noise generated inside the analog FIFO memory 10 is 4 mV. In such a case, if the level of the input signal is 5 mV, then the influence of the fixed pattern noise on the input signal is tremendously strong. Herein, assume that the voltage gain of the nonlinear expander 80 with respect to a signal having a level of 5 mV is four times and that the voltage gain of the nonlinear compressor 90 with respect to a signal having a level of 20 mV is one-fourth. Then, the level of the input signal is transformed by the nonlinear expander 80 to reach 20 mV and the signal is input to the analog FIFO memory 1. The level of the output signal of analog FIFO memory 1 is transformed again by the nonlinear compressor 90 to be 5 mV. At the same time, the level of the fixed pattern noise generated inside the analog FIFO memory 1 is also transformed by the nonlinear compressor 90 to reach 1 mV. Accordingly, since only the level of the fixed pattern noise can be transformed from 4 mV into 1 mV while keeping the signal level, the influence of the fixed pattern noise on the signal can be considerably reduced.

Figure 21A:
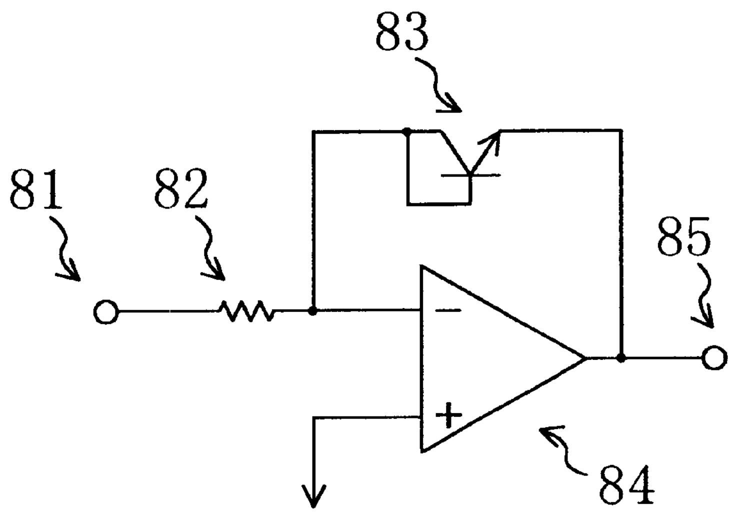
FIGS. 21A and 21B are diagrams showing exemplary circuit configurations of a nonlinear expander and a nonlinear compressor, respectively, in the analog FIFO memory device in the sixth embodiment of the present invention shown in FIG. 20.
Figure 21B:
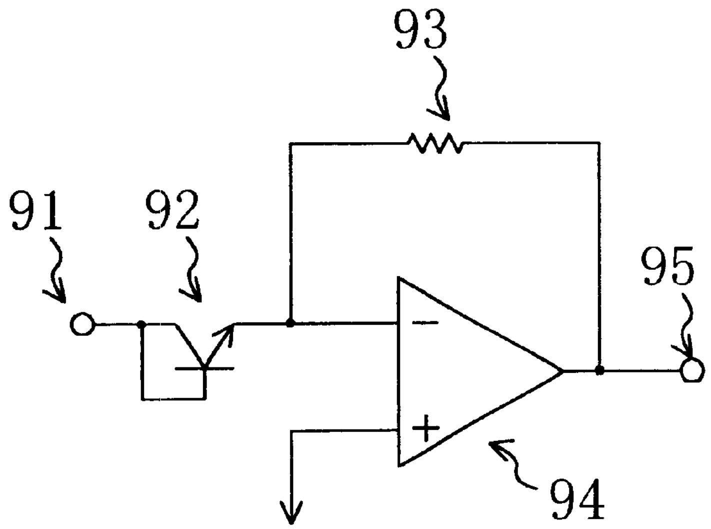
Figure 22:
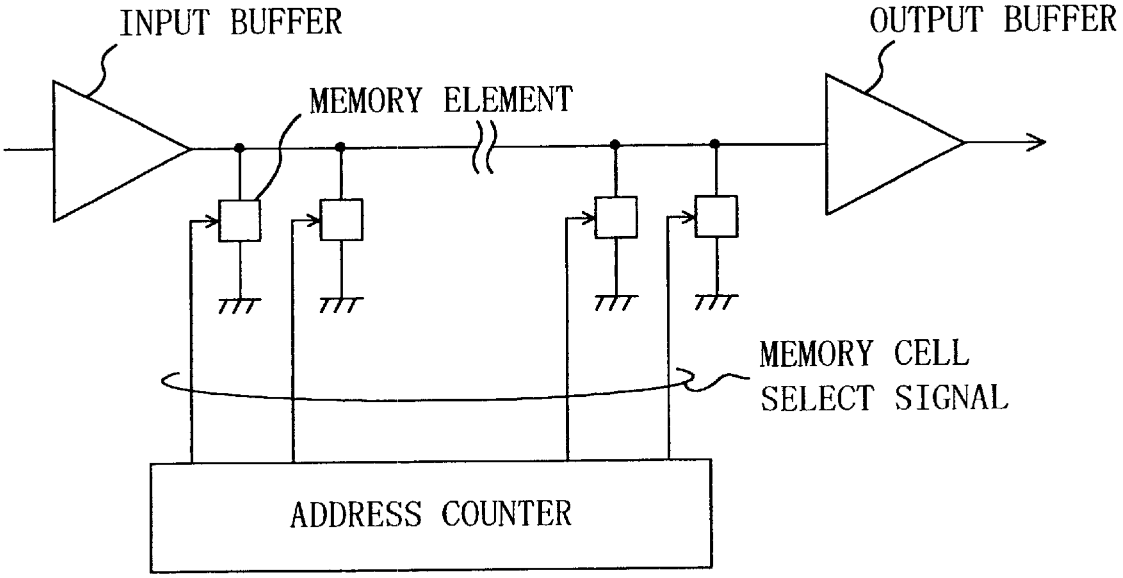
FIG. 22 PRIOR ART
FIG. 22 is a diagram showing a basic arrangement of a conventional FIFO memory.
Figure 23A:
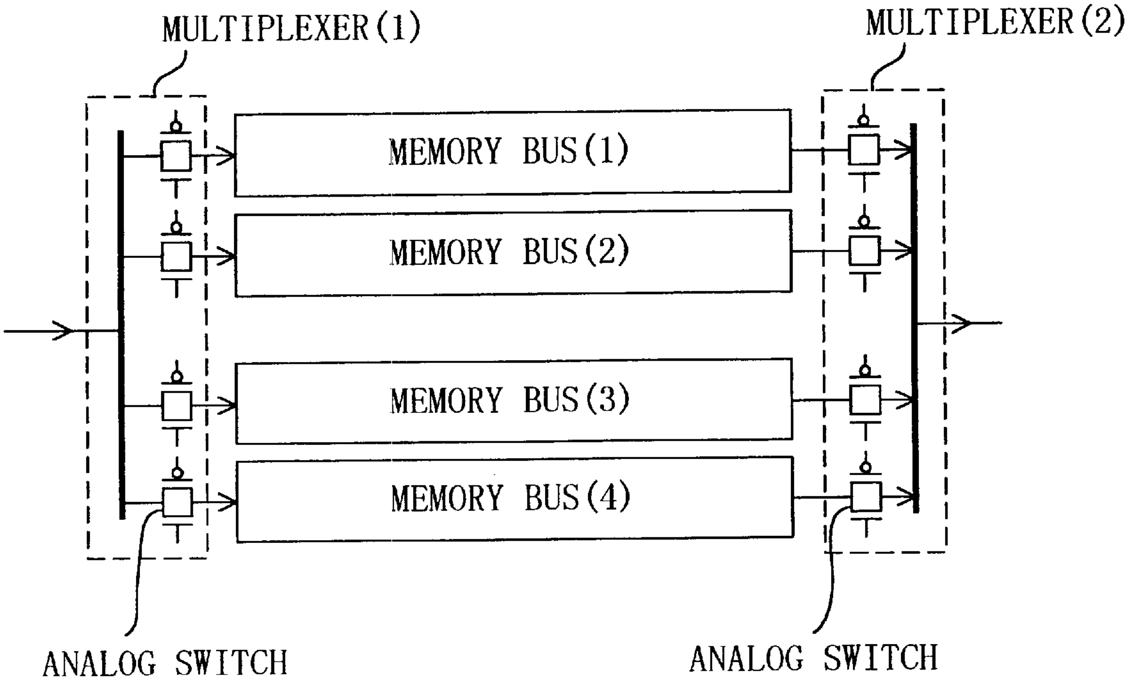
FIG. 23A PRIOR ART
FIGS. 23A and 23B are diagrams illustrating why fixed pattern noise is generated in an analog FIFO memory.
Figure 23B:
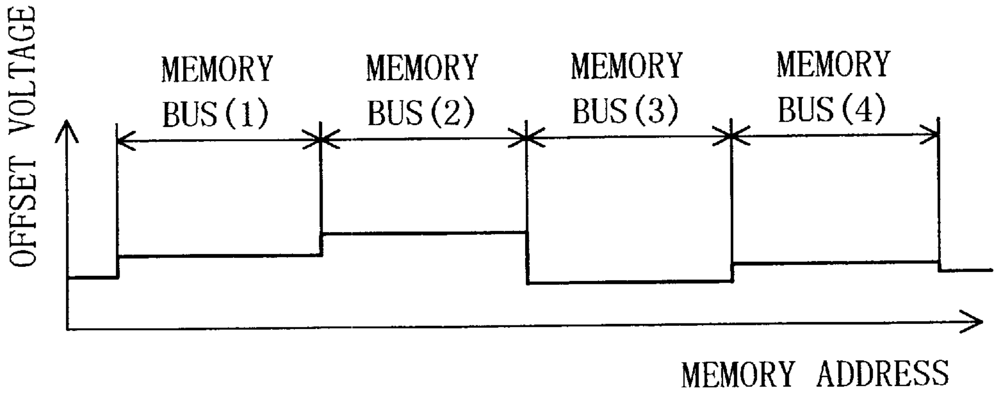
FIG. 23B PRIOR ART

FIG. 21A and 21B are diagrams showing exemplary circuit configurations for the nonlinear expander 80 and the nonlinear compressor 90 shown in FIG. 20, respectively.

In the nonlinear expander 80 shown in FIG. 21A, a signal input through an input terminal 81 is transformed by a resistor 82 into current. And the current flows into a nonlinear resistor 83 implemented as an NPN transistor. As is well known in the art, if an NPN transistor is diode-connected, then the output voltage thereof is logarithmically transformed with respect to the incoming current. Thus, an input signal, transformed in accordance with a logarithmic function, is supplied to an output terminal 85 of an operational amplifier 84.

In the nonlinear compressor 90 shown in FIG. 21B, a resistor 93 and a nonlinear resistor 92 implemented as an NPN transistor are inversely connected as compared with the circuit shown in FIG. 21A. Thus, a signal input through an input terminal 91 is transformed exponentially at a point in time when the signal is transformed into current by the nonlinear resistor 92. Since this current flows into the resistor 93, a voltage is generated between both ends of the resistor 93, as a result of the exponential transformation of the input signal. Thus, an input signal, transformed in accordance with an exponential function, is supplied to an output terminal 95 of an operational amplifier 94.

In this embodiment, not only the fixed pattern noise generated in the analog FIFO memory 1, but also all the other types of noise can be compressed. Thus, the application of this embodiment is not limited to an analog FIFO memory. Alternatively, this embodiment is applicable to substantially every sort of analog circuit, e.g., a sampling circuit such as a switched capacitor, by providing a nonlinear expander and a nonlinear compressor for the input and output sides thereof, respectively.

What is claimed is:

1. An analog FIFO memory device, comprising:

an analog FIFO memory including a plurality of memory elements, each of which stores an analog signal, the analog FIFO memory delaying input analog signals for a predetermined time and outputting the delayed analog signals in accordance with an order of input of the input analog signals;

an output transformer for performing a transformation on the output signals of the analog FIFO memory so as to reduce influence of fixed pattern noise on signal components of the output signals, the fixed pattern noise being generated inside the analog FIFO memory; and an input transformer for performing a transformation that is inverse of the transformation performed by the output transformer on the input signals of the analog FIFO memory, wherein said output transformer performs frequency modulation.

2. An analog FIFO memory device comprising:

an analog FIFO memory including a plurality of memory elements, each of which stores an analog signal, the analog FIFO memory delaying input analog signals for a predetermined time and outputting the delayed analog signals in accordance with an order of input of the input analog signals;

an output transformer for performing a transformation on the output signals of the analog FIFO memory so as to reduce influence of fixed pattern noise on signal components of the output signals, the fixed pattern noise being generated inside the analog FIFO memory; and an input transformer for performing a transformation that is inverse of the transformation performed by the output transformer on the input signals of the analog FIFO memory, wherein the output transformer performs frequency modulation such that the frequency of the fixed pattern noise is shifted to reach a higher frequency exceeding a signal band.

3. The analog FIFO memory device of claim 2, wherein the input transformer alternately performs a non-inverting operation and an inverting operation on the input signals of the analog FIFO memory in synchronism with respective times when the signals are input/output to/from the analog FIFO memory, and wherein the output transformer alternately performs a non-inverting operation and an inverting operation on the output signals of the analog FIFO memory in synchronism with the respective times when the signals are input/output to/from the analog FIFO memory.

4. The analog FIFO memory device of claim 3, wherein the input transformer includes:

a first frequency divider for dividing a frequency of a clock signal driving the analog FIFO memory; and input signal inverting means for performing the non-inverting operation on the input signals of the analog FIFO memory if an output signal of the first frequency divider is at one logic level, and for performing the inverting operation on the input signals of the analog FIFO memory if the output signal of the first frequency divider is at the other logic level, and wherein the output transformer includes:

a second frequency divider for dividing the frequency of the clock signal driving the analog FIFO memory; and output signal inverting means for performing the non-inverting operation on the output signals of the analog FIFO memory if an output signal of the second frequency divider is at one logic level, and for performing the inverting operation on the output signals of the analog FIFO memory if the output signal of the second frequency divider is at the other logic level.

5. The analog FIFO memory device of claim 3, wherein the analog FIFO memory is adapted so as to vary a number of delay stages representing a number of signals to be stored, the analog FIFO memory device further comprising signal inverting means for inverting an output signal of the output transformer if the number of delay stages of the analog FIFO memory is one of an even number and an odd number and for non-inverting the output signal of the output transformer if the number of delay stages is the other of the even number and the odd number.

6. The analog FIFO memory device of claim 3, comprising an even number of the analog FIFO memories, the respective analog FIFO memories operating in parallel with each other and being accessed sequentially and cyclically, wherein the input transformer is constituted by selectively providing, on an input side, input signal inverting means for every other one of the even number of analog FIFO memories in accordance with an order of access, and wherein the output transformer is constituted by selectively providing, on an output side, output signal inverting means for every other one of the even number of analog FIFO memories in accordance with the order of access.

7. The analog FIFO memory device of claim 3, wherein the analog FIFO memory includes:

an even number of memory buses, in each of which a plurality of memory elements for storing analog differential signals therein are connected to each other;

an input multiplexer for sequentially and cyclically inputting input analog differential signals to the respective memory buses; and an output multiplexer for sequentially and cyclically outputting the analog differential signals from the respective memory buses, and wherein the input transformer is constituted by selectively connecting the input multiplexer to every other one of the even number of memory buses in accordance with an order of input of the analog differential signals such that the analog differential signals are inverted and then input to the selected memory buses, and wherein the output transformer is constituted by selectively connecting the output multiplexer to every other one of the even number of memory buses in accordance with an order of output of the analog differential signals such that the analog differential signals are inverted and then output from the selected memory buses.

8. An analog FIFO memory device for delaying a TV signal, comprising:

an analog FIFO memory including a plurality of memory elements, each of which stores an analog signal, the analog FIFO memory delaying input analog signals for a predetermined time and outputting the delayed analog signals in accordance with an order of input of the input analog signals;

an output transformer for performing a transformation on the output signals of the analog FIFO memory so as to reduce influence of fixed pattern noise on signal components of the output signals, the fixed pattern noise being generated inside the analog FIFO memory; and an input transformer for performing a transformation that is inverse of the transformation performed by the output transformer on the input signals of the analog FIFO memory, wherein the output transformer performs a frequency modulation so as to visually eliminate fixed pattern noise from a TV image.

9. The analog FIFO memory device of claim 8, wherein the input transformer alternately performs a non-inverting operation and an inverting operation on the input signals of the analog FIFO memory in synchronism with respective times when the TV image is refreshed, and wherein the output transformer alternately performs the non-inverting operation and the inverting operation on the output signals of the analog FIFO memory in synchronism with the respective times when the TV image is refreshed.

10. An analog FIFO memory device comprising:

an analog FIFO memory including a plurality of memory elements, each of which stores an analog signal, the analog FIFO memory delaying input analog signals for a predetermined time and outputting the delayed analog signals in accordance with an order of input of the input analog signals;

an output transformer for performing a transformation on the output signals of the analog FIFO memory so as to reduce influence of fixed pattern noise on signal components of the output signals, the fixed pattern noise being generated inside the analog FIFO memory; and an input transformer for performing a transformation that is inverse of the transformation performed by the output transformer on the input signals of the analog FIFO memory, wherein the output transformer performs voltage transformation such that a level of fixed pattern noise is compressed with respect to a signal level.

11. The analog FIFO memory device of claim 10, wherein the input transformer performs a voltage transformation on the input signals of the analog FIFO memory in accordance with a logarithmic function, and wherein the output transformer performs a voltage transformation on the output signals of the analog FIFO memory in accordance with an exponential function, the exponential function being an inverse function of the logarithmic function used for the voltage transformation in the input transformer.

12. An analog FIFO memory device applicable for delaying a TV signal, comprising an analog FIFO memory including a plurality of memory elements, each of which stores an analog signal and a counter for sequentially specifying, among the memory elements, a memory element in which an analog signal is stored, the analog FIFO memory delaying input analog signals for a predetermined time and outputting the delayed analog signals in accordance with an order of input of the input analog signals, and resetting means for resetting the counter at respectively different times corresponding to every refresh of a TV image in response to a TV vertical synchronizing signal so as to change a relationship between the memory elements and positions on the TV image every time the TV image is refreshed and thereby visually eliminate fixed pattern noise from the TV image, the fixed pattern noise being generated inside the analog FIFO memory.

* * * * *